(12) United States Patent
Wood et al.

(10) Patent No.: US 8,908,920 B2
(45) Date of Patent: *Dec. 9, 2014

(54) SYSTEMS AND METHODS FOR TRACKING AND AUTHENTICATING GOODS

(71) Applicant: Covectra, Inc., Westborough, MA (US)

(72) Inventors: Stephen M. Wood, Waterford, CT (US); Richard Smith, Pottstown, PA (US); David Bear, Weston, MA (US); George Kechter, Peoria, IL (US); Conor O'Neill, Clonmel (IE)

(73) Assignee: Covectra, Inc., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/986,872

(22) Filed: Jun. 13, 2013

(65) Prior Publication Data
US 2013/0284803 A1  Oct. 31, 2013

Related U.S. Application Data

(63) Continuation of application No. 13/507,320, filed on Jun. 21, 2012, now Pat. No. 8,488,842.

(60) Provisional application No. 61/500,398, filed on Jun. 23, 2011.

(51) Int. Cl.
| | | |
|---|---|---|
| G06K 9/00 | (2006.01) | |
| G06K 5/00 | (2006.01) | |
| G07D 7/20 | (2006.01) | |
| G06F 17/00 | (2006.01) | |
| H04N 7/167 | (2011.01) | |

(52) U.S. Cl.
CPC ............ *G06K 19/05056* (2013.01); *G06K 5/00* (2013.01); *G06K 9/00577* (2013.01); *G07D 7/2033* (2013.01)
USPC ............................ 382/103; 235/375; 380/232

(58) Field of Classification Search
USPC .................. 382/103, 107, 236; 348/169–172; 380/54, 229, 232, 247, 258; 713/161, 713/169, 170, 176; 235/375, 380, 385, 435
See application file for complete search history.

(56) References Cited

U.S. PATENT DOCUMENTS

| | | |
|---|---|---|
| 4,606,927 A | 8/1986 | Jones |
| 4,785,290 A | 11/1988 | Goldman |

(Continued)

FOREIGN PATENT DOCUMENTS

| | | |
|---|---|---|
| GB | 2304077 A | 3/1997 |
| WO | 2007/090437 A1 | 8/2007 |

OTHER PUBLICATIONS

International Search Report for International Application No. PCT/US2012/043502 mailed Jul. 16, 2013, 4 pages.

(Continued)

*Primary Examiner* — Abolfazl Tabatabai
(74) *Attorney, Agent, or Firm* — Cooley LLP

(57) ABSTRACT

Systems and methods for identifying, tracking, tracing and determining the authenticity of a good are described herein. In some embodiments, a system includes an imaging system, a database, and an authentication center. The imaging system is configured to capture an image of a unique signature associated with a good at the good's origin. The unique signature can be, for example, a random structure or pattern unique to the particular good. The imaging system is configured to process the image of the good to identify at least one metric that distinguishes the unique signature from unique signatures of other goods. The database is configured to receive information related to the good and its unique signature from the imaging system; and is configured to store the information therein. The authentication center is configured to analyze the field image with respect to the information stored in the database to determine whether the unique signature in the field image is a match to the captured image stored in the database.

20 Claims, 16 Drawing Sheets
(13 of 16 Drawing Sheet(s) Filed in Color)

(56) References Cited

U.S. PATENT DOCUMENTS

| | | | |
|---|---|---|---|
| 6,722,699 B2 * | 4/2004 | Patton et al. | 283/60.1 |
| 7,350,716 B2 * | 4/2008 | Gilfix et al. | 235/492 |
| 7,702,108 B2 | 4/2010 | Amon et al. | |
| 7,831,042 B2 * | 11/2010 | Stierman et al. | 380/54 |
| 7,885,428 B2 | 2/2011 | Stierman et al. | |
| 7,891,565 B2 | 2/2011 | Pinchen et al. | |
| 8,062,737 B2 | 11/2011 | Abrams et al. | |
| 8,171,567 B1 * | 5/2012 | Fraser et al. | 726/32 |
| 2007/0036470 A1 | 2/2007 | Piersol et al. | |
| 2010/0128964 A1 | 5/2010 | Blair | |
| 2011/0135160 A1 | 6/2011 | Sagan et al. | |
| 2012/0104097 A1 | 5/2012 | Moran et al. | |

OTHER PUBLICATIONS

International Preliminary Report on Patentablity for International Application No. PCT/US2012/043502 mailed Dec. 23, 2013, 8 page.

* cited by examiner

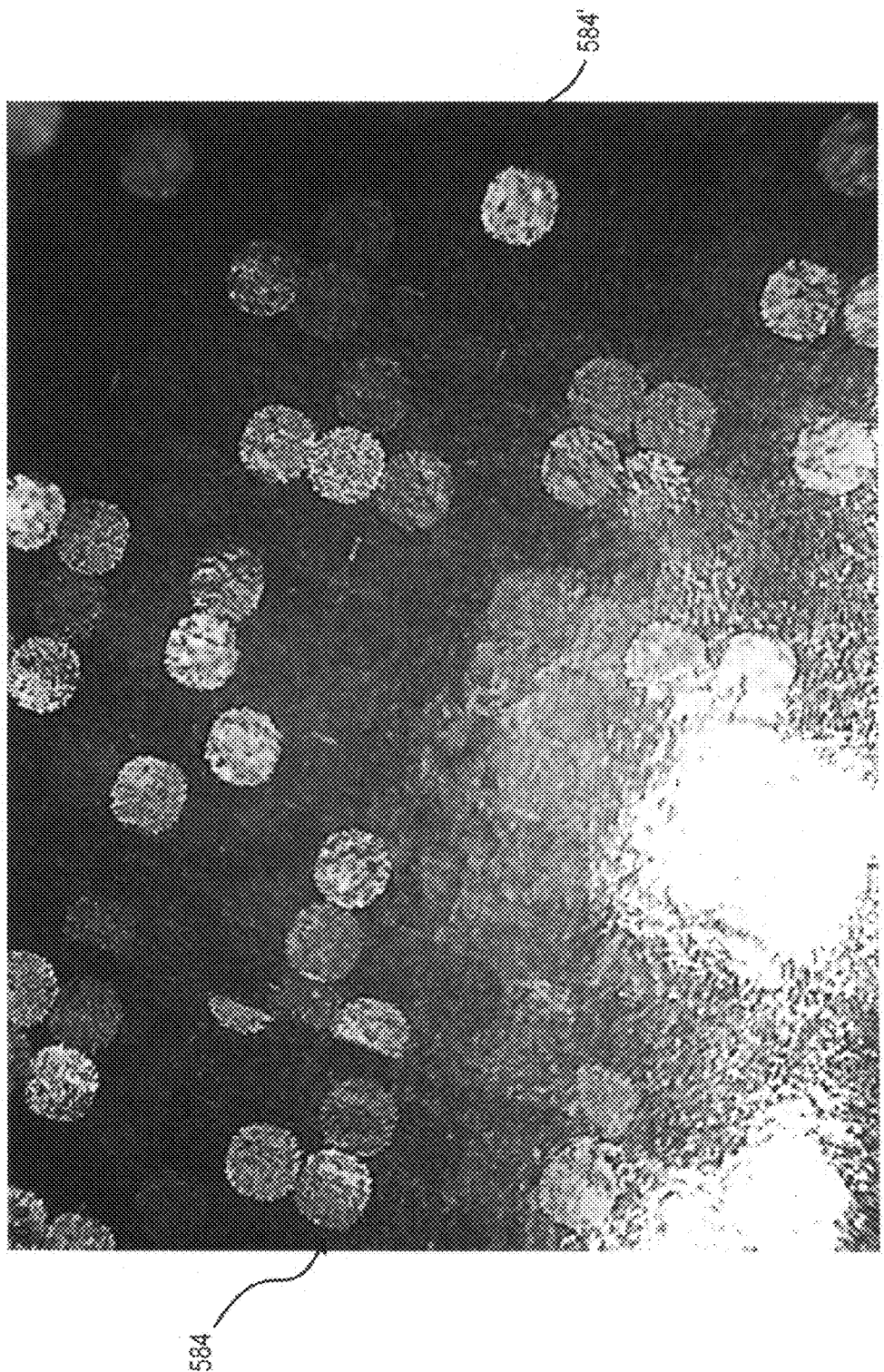

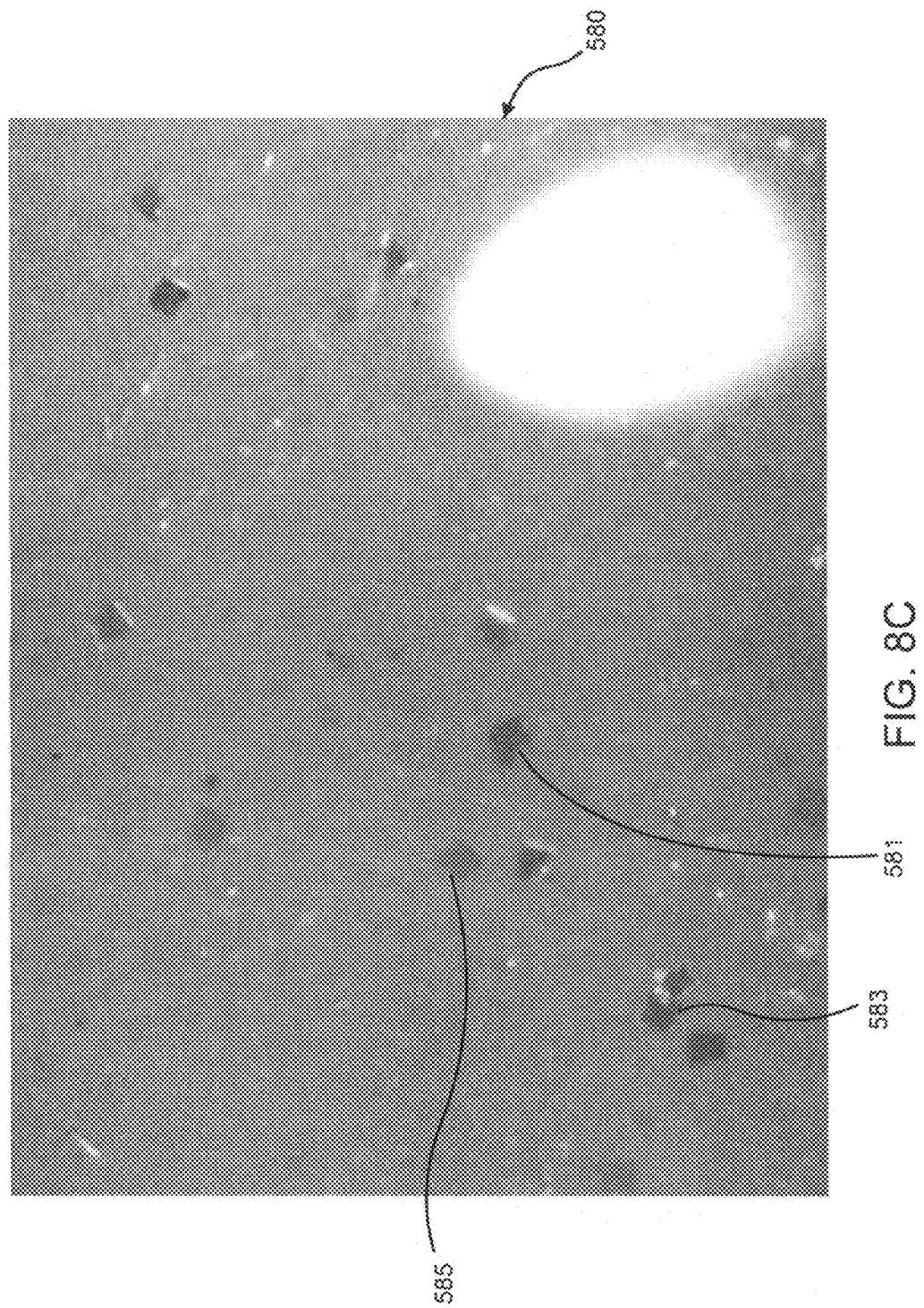

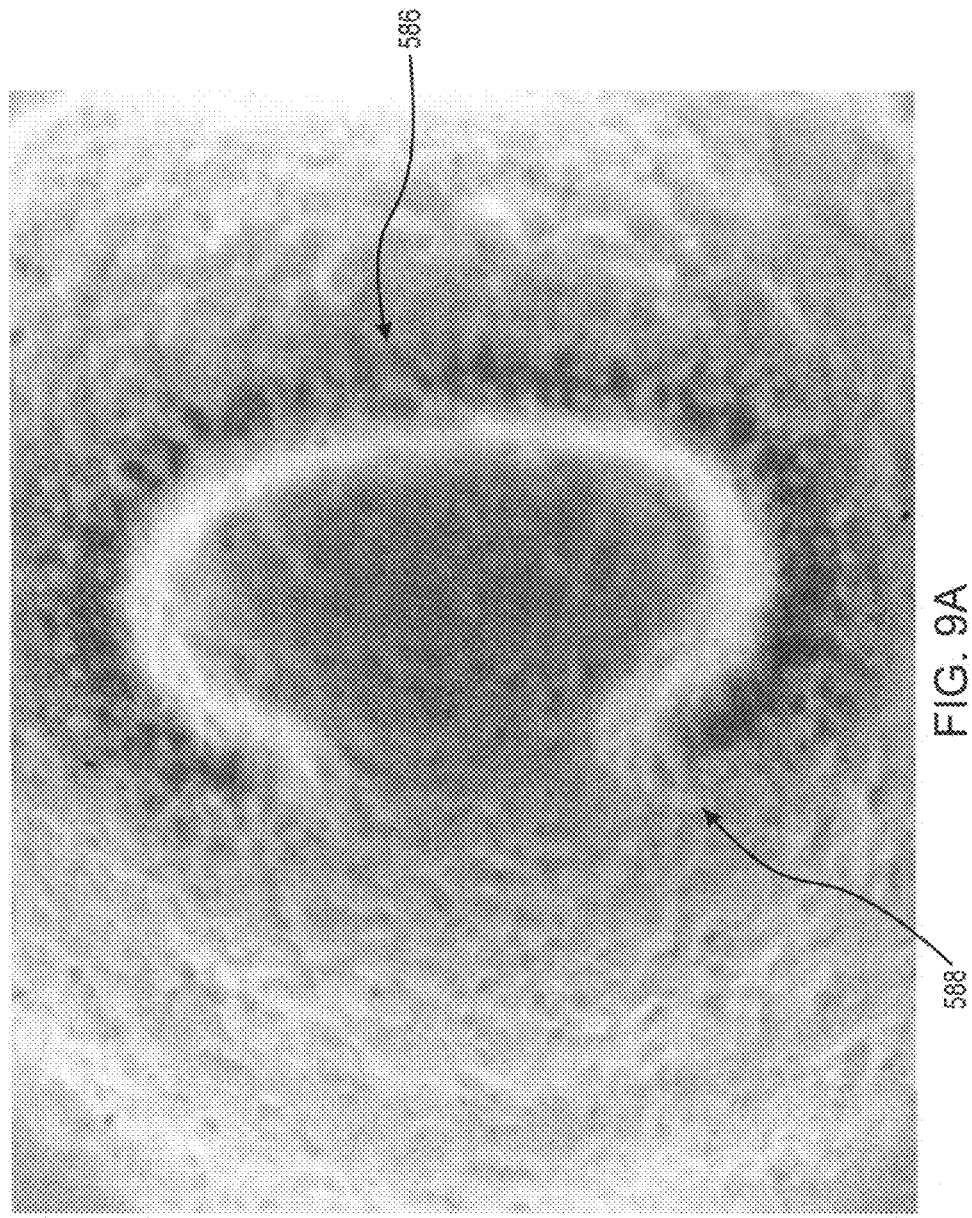

SYSTEMS AND METHODS FOR TRACKING AND AUTHENTICATING GOODS

CROSS-REFERENCE TO RELATED APPLICATIONS

This application is a continuation of U.S. patent application Ser. No. 13/507,320, filed Jun. 21, 2012, entitled "Systems and Methods for Tracking and Authenticating Goods," which claims priority to and the benefit of U.S. Provisional Application Ser. No. 61/500,398, filed Jun. 23, 2011, entitled "Systems and Methods for Tracking and Authenticating Goods," the disclosures of which are incorporated by reference herein in their entirety.

BACKGROUND

The present invention generally relates to systems and methods for identifying, tracking and authenticating an object of interest, such as a good in a supply chain, and particularly to systems and methods for identifying, tracking, tracing and authenticating a good based on a unique signature associated with the good.

The trade in counterfeit goods, worth billions of dollars each year, is a growing concern. It affects legitimate companies by violating their trademarks and devaluing corporate reputation. The trade undercuts jobs that would otherwise be offered by legitimate companies. In some cases, the trade involves a highly sophisticated network of organized crime, whose money may go to fund terrorism. Additionally, particular counterfeit goods, such as medicines, can endanger the safety and well-being of people consuming the counterfeit medicines. In the global market, as counterfeiting technologies become more sophisticated, it is becoming increasingly difficult to determine whether a good in the supply chain is authentic.

In addition to the trade in counterfeit goods, legitimate businesses must combat gray market diversion of their goods. Gray market diversion occurs when goods intended for a specific market are improperly redirected to an alternative market, usually in violation of the intent of a brand owner of a product or in violation of legal channels for a particular product. The diverter can be any entity in the supply chain including, for example, distributors, wholesalers, retailers, organize crime, or another entity. It can be difficult to track movement of authentic goods after they depart the manufacturer and are moved through the supply chain.

What is needed is an improved system for authenticating and tracking authentic goods that deters counterfeiting and diversion by providing for authentication and tracking of goods at the individual unit level as each individual unit is moved through the supply chain.

SUMMARY OF THE INVENTION

Systems and methods for identifying, tracking, tracing and determining the authenticity of a good are described herein. In some embodiments, a system includes an imaging system, a database, and an authentication center. The imaging system is configured to capture an image of a unique signature associated with a good at the good's origin. The unique signature can be, for example, a random three-dimensional structure or pattern unique to the particular good. The imaging system is configured to process the image of the good to identify at least one metric that distinguishes the unique signature from unique signatures of other goods. The database is configured to receive information related to the good and its unique signature from the imaging system, and is configured to store the information therein. The authentication center is configured to analyze the field image with respect to the information stored in the database to determine whether the unique signature in the field image is a match to the captured image stored in the database.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 7A-7B are images of portions of labels having unique features that can be included in unique signatures according to embodiments.

FIGS. 8A-8C are images of portions of a label having a unique signature according to an embodiment, shown at 10×, 30×, and 50× magnification, respectively.

FIGS. 9A-9D are images of pharmaceutical tablets having unique features that can be included in a unique signature for each tablet according to embodiments.

DETAILED DESCRIPTION

Figure 1:
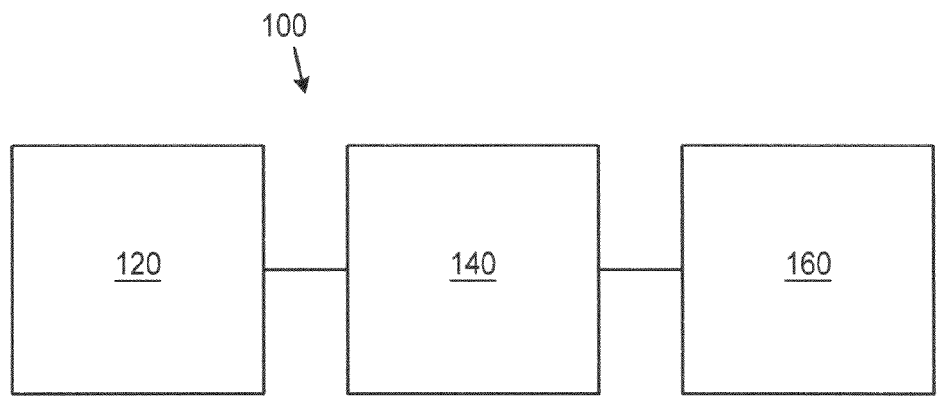
FIG. 1 is a schematic illustration of a system according to an embodiment.

Systems and methods for tracking and authenticating a good are described herein. Such systems and methods are useful to prevent the dissemination of counterfeit and diverted goods. Additionally, such systems and methods can be utilized by manufacturers, distributors, import and/or export authorities, wholesalers, retailers, law enforcement authorities, or others within a supply chain to determine whether a good being handled is authentic, as well as to track movement of the good through the supply chain. In some embodiments, the systems and methods described herein relate to analyzing a unique signature of a good at a first period of time, storing data associated with the unique signature, and authenticating the good using the unique signature at a second period of time different than the first period of time.

As used herein, "a good" refers to any item, article, or product, including, but not limited to, a product label, identification card, product packaging, distribution packaging (e.g., a carton, box, pallet, or the like), pharmaceutical packaging (e.g., a carton, bottle, blister pack, pouch, bag, label, or other container), a pharmaceutical unit of sale (e.g., a testing strip, a medicament strip, patch, tablet, capsule, oral thin film, bioerodible mucoadhesive film, or the like), or another individual unit, item, product, or article. For example, a good can refer to a pharmaceutical, jewelry, beverage, cosmetic, or any other product.

As used herein, the term "unique signature" refers to a feature or combination of features that is unique to an individual or particular good and which can distinguish the particular good from another good (e.g., in a group of similar goods). Said another way, the unique signature is a characteristic of one particular good which distinguishes that good from a seemingly similar good. A good bearing the unique signature is considered to be authentic. In this manner, the unique signature can be used to help determine whether a good is authentic or counterfeit.

Among a class of objects such as units of sale of pharmaceuticals, each object may be assigned a unique number (serialization). Each object, in the system to be described, is then associated with a unique signature which is unrelated to the serial number (i.e., cannot be derived from the serial number). This system and method of authentication should be distinguished from, for example, the use of a hologram applied repetitively to the class of objects, which is assumed to be difficult to copy.

The unique signature can be an inherent unique feature of the good, such as a unique structural feature that is inherent or intrinsic to the material of which the good is constructed or that is formed in and/or on the good as a by-product of the manufacturing process. Generally, substantially every manufactured good has an inherent unique feature viewable on at least some level of magnification, e.g., whether with the unaided eye or at a microscopic level. For example, the unique signature of a good can be a unique pattern, thickness, topography, or the like, formed by a variation in a material of which the good is constructed or a variation formed as a by-product of the manufacturing process.

In some embodiments, the natural variability or uniqueness of the good can be enhanced such that the unique features are more visible at a lower level of magnification and/or resolution. For example, the unique signature can include a unique feature intentionally formed, disposed, applied, or otherwise created in and/or on a good. For example, a unique signature can include a unique feature imprinted, embossed, and/or debossed on the good. In another example, a unique signature can include flecks (e.g., relatively small spots of color and/or reflectance) or particles randomly disposed in and/or on the good, or on a label applied onto the good, such as a closure seal. In some embodiments, the flecks or particles can be substantially planar. In some embodiments, the flecks or particles can be substantially coplanar. The flecks or particles need not be coplanar, creating a distinctive refractive/reflective pattern that is a function of illumination. The non-coplanar flecks or particles can be configures such that only a portion of the flecks or particles "illuminate" with certain lighting patterns, thus making counterfeiting (e.g., by a photocopy machine) more difficult. Said another way, the non-coplanar flecks can be randomly oriented such that based any given lighting pattern, only a portion of the flecks reflect light that can be captured by an image capture device (e.g., camera). Thus, different lighting patterns illuminate different flecks and therefore, different patterns. For example, the flecks can be small, flat individual pieces of a material suspended within a laminate. Note that the terms "flecks" and "particles" are used interchangeably herein, unless the context clearly dictates otherwise. In another example, the unique signature can include a printed unique or random pattern of dots. The dots can be any suitable color or combination of colors, and can be made by random number localization within a matrix, where the ink could have reflective properties such as a colloidal dispersion. The dots can be formed, for example, by printing the patterns (e.g., with an inkjet printer) onto a label or a portion of a good. In yet another example, a unique signature can include a pattern of whorls and arches on the good, similar in many respects to a human fingerprint (and also referred to herein as a flow-like signature). In some embodiments, the unique signature is two-dimensional. Two-dimensional unique signatures require fewer images, lower resolution, and a reduction of data to be stored. In some embodiments, the unique signature is three-dimensional. Additionally, the unique signature can include any combination of the foregoing unique features. Examples of unique signatures according to various embodiments are described in more detail herein.

In some embodiments, a system includes an imaging system, a database, and an authentication center. The imaging system is configured to capture an image of a unique signature associated with a good at a first period of time. For example, the imaging system can be configured to capture the image of the good's signature at the good's origin (e.g., in a manufacturing facility). The imaging system is configured to process the image of the good to identify at least one metric associated with the unique signature that distinguishes the unique signature from a different unique signature for a different good. A pre-serialized code (e.g., an alphanumeric code or barcode) or fiducial mark may also be employed to determine where the signature is obtained. In other words, the pre-serialized code can include information as to where on the good (or label) the unique signature is located. For example, the pre-serialized code can include information as to the location of the unique signature with respect to a fiducial mark, described in more detail herein, on the good (or label). The database is configured to receive information related to the good and its unique signature from the imaging system, and is configured to store the information therein. The authentication center is configured to analyze a field image of the unique signature captured at a second period of time, later than the first period of time. The authentication center can be configured to analyze the field image, for example using its identified metric, with respect to information stored in the database to determine whether the unique signature in the field image is a match to the captured image stored in the database.

In some embodiments, a system includes a computing device, an imaging system, a database, a field imaging system, and an authentication center. The computing device is configured to facilitate serialization of the good, for example, at the good's origin. The imaging system is configured to capture an image of a unique signature associated with a good. The field imaging system includes a light source, which can illuminate the image (i.e., provide a "field illumination") in a manner consistent with illumination of the image at the point of packaging of the good (an "origin illumination"). The imaging system may also include a light source configured to provide light according to a specified lighting configuration and an image capture device configured to image the unique signature by reading the light scatter of the signature when the signature is exposed to the light source according to the specified lighting configuration. The database is configured to receive information related to the good and its unique signature from the imaging system, and is configured to store the information therein. The field imaging system is configured to capture a field image of the unique signature associated with the good. The field imaging system can be, for example, a hand held device. In some embodiments, the field imaging system includes a light source configured to provide field illumination consistent with the origin illumination and/or to replicate the specified lighting configuration for capturing the field image of the unique signature. The authentication center is configured to receive the field image from the field imaging system and to analyze the field image with respect to information, including at least one of the captured image and information related to serialization of the good, stored in the database, to determine whether the unique signature in the field image is a match to the captured image stored in the database. In some embodiments, an authentication system also includes a unique signature production system configured to generate or otherwise produce the unique signature of the good.

In some embodiments, a label includes a substrate and a plurality of flecks randomly distributed on the substrate. At least a portion of the plurality of flecks forming a unique signature are configured to be associated with a good and to be captured by an imaging device for verifying the authenticity of the good. The label may include a serialization code configured to be electronically associated with the unique signature. The label can include a top layer coupled to the substrate, and the plurality of flecks can be randomly disposed between the substrate and the top layer. The plurality of flecks can be disposed in an adhesive layer between the base layer and the top layer. The serialization code can include at least one of a unique alphanumeric or bar code having instructions for a lighting configuration to be implemented by the imaging device for capturing an image of the unique signature. The serialization code can include instructions identifying which portion of the label includes the unique signature. The serialization code can include instructions for locating the unique signature with reference to a fiducial mark. The serialization code can include a bar code. A graphic can be printed onto the top layer of the label. The label can include a fiducial mark. The flecks can have different colors. The flecks can be multi-colored. The flecks can be substantially planar.

In some embodiments, a system includes a plurality of labels and a database. Each label of the plurality of labels includes a unique signature formed by a random pattern of particles disposed thereon. Each label of the plurality of labels may include a serialization code. The database is configured to store information associated with the unique signature of each label of the plurality of labels and to store information associated with the serialization code of each label of the plurality of labels such that the information associated with the unique signature for a first label of the plurality of labels is electronically linked to the information associated with the serialization code of the first label. The code of the first label can include instructions for a lighting configuration to be implemented by an imaging device for capturing an image of the unique signature of the first label, instructions identifying which portion of the label includes the unique signature, and/or instructions for locating the unique signature with reference to a fiducial mark. The system can include an authentication center in electrical communication with the database and configured to interrogate the unique signature of the first label of the plurality of labels. The authentication center can be configured to make an authenticity determination based on the interrogation. The particles can have different colors. The particles can be multi-colored. The particles can be substantially planar.

In some embodiments, a method includes capturing an image of a unique signature, the unique signature formed by a random pattern of particles disposed on a substrate, processing the captured image to identify metrics associated with unique aspects of the unique signature in the captured image, and comparing the identified metrics with metrics associated with a plurality of unique signatures stored in a database. The unique aspects can include at least one of a distribution of the particles, sizes of particles, elevation of the particles with respect to the substrate, color variation amongst the particles, or reflectiveness of the particles, or a combination of the foregoing. The substrate can be a label. The method can include implementing a pre-determined lighting configuration for capturing the image. The method can include making an authenticity determination of the unique signature based on the comparison. The processing can include executing a visioning algorithm to identify the metrics associated with the unique signature. The method can include identifying a fiducial mark coupled to the substrate, and locating, prior to the capturing, the unique signature with respect to the fiducial mark. The particles can be multi-colored. The particles can be substantially planar.

In some embodiments, a method includes capturing an image of a unique signature, the unique signature formed by a random pattern of particles disposed on a substrate, processing the captured image to detect unique aspects of the unique signature in the captured image, storing, in a database, metrics information associated with the detected unique aspects, storing, in the database, information associated with a serialization code coupled to the substrate, and electronically linking the stored metrics information with the stored information associated with the serialization code. The serialization code can be a barcode or human readable alphanumeric code.

As schematically illustrated in FIG. 1, a system 100 for tracking and authenticating a good according to an embodiment includes an imaging system 120, a database 140, and an authentication center 160. The imaging system 120 is configured to characterize a unique signature of a good, which can include capturing an image of, or otherwise reading, the good's unique signature and detecting one or more of the unique features that comprise the unique signature. For example, the imaging system 120 can include an image sensor, camera, or other imaging technology configured to capture an image of or otherwise read the good's unique signature. In some embodiments, the imaging system 120 is configured to read or capture the image of the good's unique signature using at least one of no magnification, low-magnification (e.g., up to about 10×) or high-magnification (e.g., in some embodiments, at least about 10×, at least about 30×, or at least about 50× magnification). The imaging system 120 can be configured to capture the unique signature image with pixel sizes sufficient to permit a processor (not shown in FIG. 1) to process the image, as described in more detail herein. For example, in some embodiments, the imaging system 120 can capture the unique signature image having pixel sizes of about 0.001 inches.

The imaging system 120 is configured to quickly capture the image of the unique signature. For example, in some embodiments, the imaging system 120 is configured to capture the unique signature image in such a short period of time that line speed (e.g., a speed at which the good is moved through a production line) is not adversely affected. The imaging system 120 can be included in or used with a system in place in a manufacturing facility for quality inspection of the good. In this manner, the imaging system 120 can be integrated into a manufacturing process with little to no adverse impact on the manufacturing production rate for the good.

The imaging system 120 is configured to detect unique aspects of the image associated with the unique features that comprise the unique signature. For example, the imaging system 120 can include a processor configured to process (e.g., by executing an algorithm) the captured image in a manner sufficient to detect one or more distinguishing features of the good's unique signature. The imaging system 120 can be configured to detect unique aspects related to the shape, spacing, size, pattern, shading, or the like, exhibited by the unique signature (or at least one unique feature comprising the unique signature). For example, when a unique signature includes flecks or particles, the imaging system 120 can be configured to detect the distribution of the flecks or particles (e.g., with respect to a reference point or barcode, other flecks or particles, or another portion of the good) in at least one of a two-dimensional or three-dimensional space, the size of the flecks or particles, the elevation, depth, or other three-dimensional characteristic of the flecks or particles (e.g., with respect to a surface of the good), a color variation of or shading caused by the flecks or particles (e.g., which may occur by the scattering or reflection of light during the imaging process), one or more colors of the flecks or particles, or another unique aspect of one or more flecks or particles. For example, in some embodiments, the colors of the three-dimensional flecks or flecks three-dimensionally disposed in the signature, as detected by the imaging system 120, are varied because of the different indices of refraction of the flecks resulting from their different orientations, sizes, shapes and/or thickness, or a combination thereof. The color(s) of the flecks of the unique signature can also affect how the unique signature is detected by the imaging system 120. In some embodiments, a plurality of flecks and/or particles includes individual flecks or particles of different colors. Said another way, a plurality of flecks can include at least one red fleck, at least one blue fleck, at least one yellow fleck, at least one green fleck, and/or at least one fleck of one or more different colors. Any suitable number of different colored flecks may be used, including one or more flecks of one, two, three, four, or more different colors.

In another example, the imaging system 120 can be configured to detect one or more unique aspects related to a flow-like unique signature, such as one or more whorls, arches, valleys, a shadow cast by at least one of a whorl, arch, or valley, or another unique aspect related to the shape and/or three-dimensional structure of the flow-like unique signature, or a combination thereof. In some embodiments, the imaging system 120 is configured to convert unique two- or three-dimensional characteristics detected in the unique signature into two-dimensional metrics on an x-y axis, which can facilitate the authenticity analysis, as described in more detail herein.

In some embodiments, the imaging system 120 is configured to compress, or otherwise alter, a file including the captured image and/or data related to the unique signature; for example, to facilitate transmission of the captured image and/or data from the imaging system 120 to the database 140 and/or to facilitate storage of the file(s) in the database.

As schematically illustrated in FIG. 1, the database 140 is configured to be in electrical communication with the imaging system 120. The database 140 can be in electrical communication with the imaging system 120 in any suitable manner, including, for example, directly via wired or wireless electrical connections, indirectly via an intervening system, network, intranet, internet, cloud, or the like, or any combination of the foregoing. The database 140 is configured to receive information or data from the imaging system 120. For example, the database 140 can be configured to receive from the imaging system 120 the image of the unique signature, data associated with the image of the unique signature, and/or data associated with the characterization of the unique signature or its image (e.g., the metrics).

The database 140 is configured to store the information received from the imaging system 120. For example, the database 140 can be configured to store at least one of the captured image of the unique signature, information or data associated with the captured image, information or data associated with the characterization of the unique signature or characterization of the image of the unique signature, or a combination of the foregoing. In some embodiments, the database 140 is configured to store the captured image in a manner that the captured image is electronically linked with other information or data associated with the captured image or characterization of the unique signature that is also stored by the database. In this manner, when the captured image is retrieved, from the database 140, the linked information or data is retrieved, or is easily retrievable, with the captured image, or vice versa.

The authentication center 160 of system 100, schematically illustrated in FIG. 1, is configured to verify the authenticity of the good. The authentication center 160 can be configured to verify the authenticity of the good at any specified point in the supply chain. For example, the authentication center 160 can be configured for use at any point in the supply chain following the characterization of the good's unique signature by the imaging system 120. The specified point can be, for example, any point in a distribution channel, at a wholesaler, at a retailer, at customs (e.g., if the good is being imported and/or exported), upon delivery to a consumer, or another point in the supply chain.

The authentication center 160 is configured to authenticate (or determine the authenticity of) the good. In some embodiments, authentication includes characterizing the unique signature of the good at the specified point (also referred to herein as the "field characterization") and analyzing the information obtained from the field characterization against the information stored in the database 140. The authentication center 160 can be configured to characterize the unique signature in a similar manner as described above with respect to the imaging system's 120 characterization of the unique signature in the captured image. For example, the authentication center 160 can be configured to characterize the good's unique signature by reading or capturing an image of the signature at the specified point (also referred to herein as the "field image") and processing the field image to detect unique features included in the signature. In some embodiments, for example, the authentication center 160 includes a processor configured to execute an algorithm for detecting in the field image at least one unique feature or aspect of the unique signature. The authentication center 160 can be configured to generate two-dimensional metrics on an x-y axis that correlate to the unique feature(s) detected.

The authentication center 160 is configured to be in electrical communication with the database 140. As such, the authentication center 160 can query information stored in the database for analyzing information associated with the field characterization against the stored information. In some embodiments, the authentication center 160 is configured to analyze the information associated with the field characterization of a good's signature with respect to information stored in the database for that particular good, including information about the good's unique signature as characterized by the imaging system 120. For example, the authentication center 160 can analyze data associated with the particle distribution in a unique signature from a field image against data stored in the database that includes data associated with particle distribution in the unique signature of the same good at a previous point in time. In some embodiments, the authentication center 160 is configured to analyze the information associated with the field characterization of a good's signature with respect to a set or subset of information stored in the database. For example, the information associated with the field characterization of the good's signature can be analyzed with respect to information stored in the database for a class of goods (e.g., pharmaceuticals) or a subclass of goods (e.g., opioids). In another example, the information associated with the field characterization of the good's signature can be analyzed with respect to information stored in the database for goods originating from a particular region, manufacturer, or other organizational factor. In some embodiments, the system 100 can be configured to self-authenticate (e.g., without access to the interne) by use of a check-sum or database downloaded to a field inspector's mobile device.

The analysis performed by the authentication center 160 includes determining whether the field image (or its data) is sufficiently similar to a stored image (or its data) to indicate that the good from which the field image was captured is the same good from which the stored image was captured; i.e., whether the field image is a match to a stored image. If the field image is matched by the authentication center 160 to a stored image, the authentication center can determine or verify that the good is authentic. If the field image is not matched by the authentication center 160 to a stored image, the authentication center can determine that the good is not authentic or is counterfeit. Additionally, in some embodiments, the authentication center 160 is configured to determine that the analysis of a field image against a stored image is inconclusive as to authenticity.

In some embodiments, the authentication center 160 is configured to perform the analysis based on other information in addition to the characterization information from the initial characterization and the field characterization, such as information related to geographic location, a date, or the like, which may be stored in the database 140.

The authentication center 160 can include a computer processor configured to execute an algorithm, an operator (e.g., human or pigeon) trained for visual examination and/or analysis of the unique signature (e.g., on the good itself, in the captured image, and/or in the field image), or any combination of the foregoing. In some embodiments, the authentication center 160 is configured to automatically execute an algorithm for verification of a good's authenticity based on the unique signature. The authentication center 160 can be configured to execute an algorithm (e.g., an automated algorithm) for statistical comparison of the field characterization, field image, or associated metrics against the initial characterization, captured image, associated metrics, or other information stored in the database 140, in which the algorithm includes mutual information, Pearson's chi-square and/or x-squared tests, Spearman's rank correlation coefficient (or Spearman's rho), another statistical correlation, or any combination of the foregoing. Additionally, the authentication center 160 can include a neural network, a support vector machine, another statistical learning tool or algorithm, or any combination of the foregoing, to facilitate authentication of the good.

The authentication center 160 can be configured to perform the analysis until a match is found between the field image (or its data) and a stored image (or its data) (i.e., until a determination is made that the good is authentic), until a determination of lack of authenticity is made, until a determination is made that authenticity is inconclusive, until the field image has been analyzed against all stored images in at least a specified set of information stored the database 140, for a specified duration of time, or any combination of the foregoing. The authentication center 160 can be configured to produce a signal indicating a determination of at least one of authenticity, lack of authenticity, or inconclusiveness as to authenticity.

Figure 2:
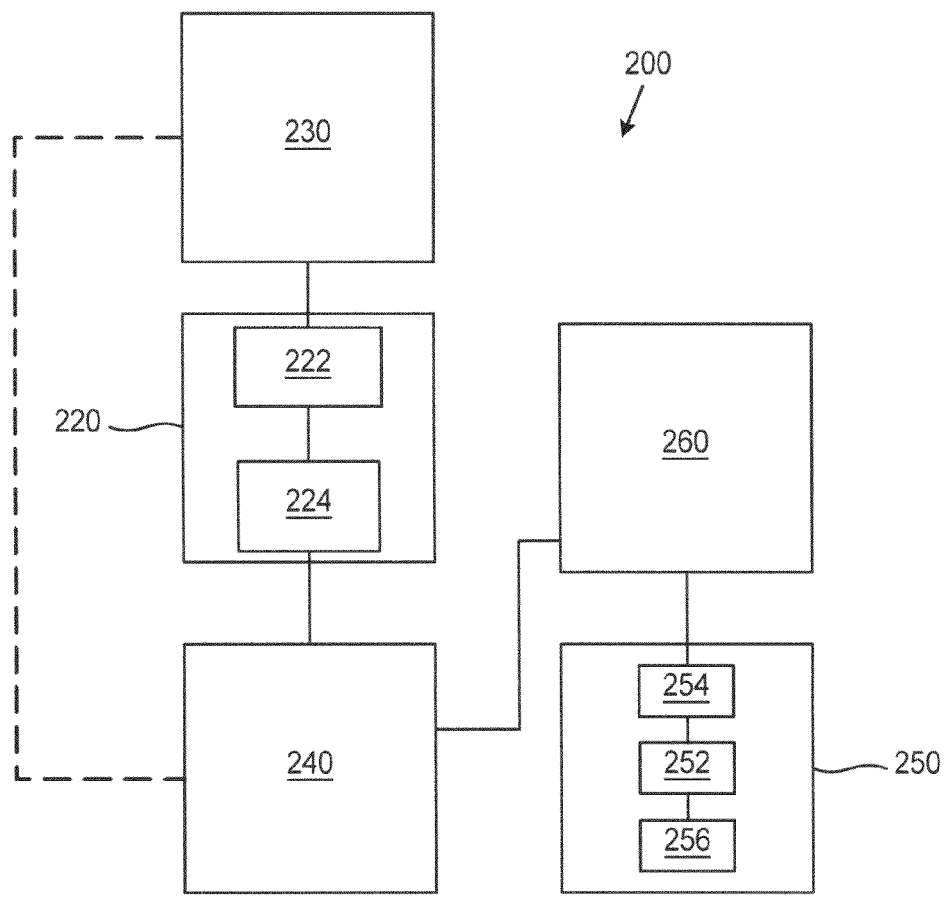
FIG. 2 is a schematic illustration of a system according to an embodiment.

A system 200 according to an embodiment for identifying, tracking and authenticating a good is schematically illustrated in FIG. 2. The system 200 includes a computing device 230, an imaging system 220, a database 240, a field imaging system 250, and an authentication center 260.

The computing device 230 is configured to assign a code to the good. The code can be a unique identifier, including, for example, any combination of numbers, letters, or unique characters. For example, the code can be a serial number. In some embodiments, the computing device 230 is configured to generate a serialization code to be associated with a good, which can include the serial number as the unique identifier and which can also include computer code that includes configuration instructions for the imaging system 220, as described in more detail herein. In some embodiments, the serialization codes associated with a good, or disposed on a set of labels, include codes that increase in pre-determined numerical increments. In some embodiments, the serialization codes are random codes and do not increase in pre-determined numerical increments. In some embodiments, for example when serialization of the goods is undesired by the brand owner, the code can include a unique two-dimensional bar code and/or a unique human readable alphanumeric code, each of which is digitally linked to the other for use in secure authentication.

In some embodiments, the computing device 230 is configured to transmit the code to a printing system (not shown in FIG. 2) such that the code can be printed onto the good, a label to be applied to the good, packaging for the good, or the like. Any suitable printing mechanism can be used to print the serialization code onto the good or label, including, for example, a printing mechanism utilizing piezo-electric print technology. The printing system can be configured to dispose the serialization code on the good or label such that at least a portion of the code is visible to an unaided eye, or such that at least a portion of the code is invisible to the unaided eye.

The imaging system 220 is configured to characterize a unique signature of the good. The imaging system 220 can be similar in many respects to imaging system 120 described above. The imaging system 220 includes a light source 222 and an image capture device 224. The light source 222 is configured to produce light to illuminate at least a portion of the unique signature of the good when the good is exposed to the light source for image capture. In this manner, distinguishing aspects of the unique signature as read or captured by the imaging system can be affected by the lighting configuration of the light source. The light source 222 can be configured to produce light that is on at least one of the visible, ultraviolet or infrared wavelengths. In this manner, for example, the light source 222 can be configured to facilitate viewing of a unique signature feature that is fluorescent. Additionally, the light source 222 can be configured to produce light in a variety of configurations based on a number of lighting characteristics, including, for example, an amount of illumination (e.g., a specified number of lights), an angle at which light is directed at the unique signature (the "angle of incidence"), a color wavelength of the light, polarization of the light waves or beams, a degree of coherency of the light waves, a degree of diffusion or focus of the light, or any combination of the foregoing. In some embodiments, the light source 222 of the imaging system 220 is configured to produce a lighting configuration for the good based on instructions in the serialization code received by the imaging system 220 from the computing device 230.

The light source 222 of the imaging system 220 can include any suitable type of light including, for example, a light emitting diode ("LED"), an incandescent light, a fluorescent light, an ultraviolet light, or another suitable type of light. For example, in some embodiments, the light source 222 includes an LED array. More specifically, in some embodiments, the light source includes five banks of LED arrays. Each bank of LEDs can selectively be turned on to emit light or turned off for a particular lighting configuration. As such, the five LED banks can generate thirty-two lighting configurations based on whether each array of the five is turned on or off (i.e., $2^5$ configurations, where 2 represents the options of being on or off, and 5 represents the number of LED banks). Accordingly, the light source 222 can have an exponential number of lighting configurations based on the number of light arrays, as well as the other lighting characteristics noted above, or combination of thereof. A specified lighting configuration further deters copying of the unique signature or good, because a potential counterfeiter would need to know both the unique features comprising the unique signature of the good and the specified lighting configuration for imaging the unique signature in order to produce a passable copy of the good.

In some embodiments, the imaging system 220 includes a chamber or other designated area in which at least the unique signature of the good is configured to be positioned for being illuminated by the light source 222. When the light source 222 illuminates the portion of the good including the unique signature, the good will scatter the light field. For example, one or more unique features included in the unique signature can reflect, transmit, or otherwise scatter the light field.

The image capture device 224 of the imaging system 220 is configured to record the light field as it is scattered by the unique signature of the good, thus capturing an image of the unique signature of the good. In some embodiments, the image capture device 224 includes at least one of complementary metal-oxide-semiconductor ("CMOS") technology or charge-coupled device ("CCD") technology. For example, the image capture device 224 can include an image sensor including at least one of a CMOS or CCD array, along with associated electronics as included in known machine vision systems. The image capture device 224 is configured to detect unique features in the captured image such that the detected unique features can be associated with the good's signature in the imaging system 220.

In some embodiments, the imaging system 220, or the image capture device 224 particularly, can be configured to compress the file including the captured image and/or data associated with the captured image, for example, to facilitate transmission of the captured image file.

The database 240 is configured to receive information from the imaging system 220. For example, the database 240 is configured to receive the captured image file from the imaging system 220. In another example, the database 240 is configured to receive the serialization code from the imaging system 220. The database 240 can be similar in many respects to database 140 described above. The database 240 is configured to store the information received from the imaging system 220. In some embodiments, the database 240 is configured to store the captured image so that the captured image is electronically linked with other information associated with at least one of the captured image or the unique signature, or with the serialization code, which are also stored by the database. In this manner, when the captured image is retrieved from the database 240, the linked information can be retrieved with the captured image, or vice versa. The database 240 can be configured for long-term or permanent storage of the information received from the imaging system 220, and can include, for example, a hard drive system.

The database 240 can be configured to be in electrical communication with other components of the system 200, in addition to the imaging system 220. In some embodiments, the database 240 is in electrical communication with the computing device 230, as shown in dashed lines in FIG. 2. For example, the database 240 can be placed in communication with the computing device 230 such that information associated with the serialization code can be transmitted from the computing device 230 to the database 240 (e.g., independently of the imaging system 220) for storage therein. In another example, the database 240 can be configured to be in electrical communication with the authentication center 260 such that the database can be queried by the authentication center, as shown in FIG. 2 and described in detail herein. The database 240 can be configured to store a record of each query transmitted from the authentication center and/or of each authentication determination.

The field imaging system 250 of the authentication system 200, schematically illustrated in FIG. 2, is configured to capture an image of at least a portion of the good where the unique signature should be located (referred to herein as the "field image"). For example, the field imaging system 250 can be configured to capture a field image of at least a portion of a label of the good. The field imaging system 250 can include a code reader, a light source, and an image capture device. The code reader 256 is configured to read the serialization code associated with the good. For example, in some embodiments, the serialization code is printed on a surface of the good, and the code reader 256 is configured to read the printed serialization code. In reading the serialization code, the code reader 256 is configured to read instructions included in the code for any specified light characteristics that should be applied or produced by the field imaging system 250 to accurately capture an image of the unique signature for this particular good. The instructions may specify a lighting configuration, including, for example, an amount of illumination (e.g., a specified number of lights), an angle of incidence, a color wavelength of the light, polarization of the light waves or beams, a degree of coherency of the light waves, a degree of diffusion or focus of the light, or any combination of the foregoing. The light source 252 of the field imaging system 250, which can be similar in many respects to the light source 222 of the imaging system 220 described above, is configured to produce light in a variety of configurations based on any combination of the foregoing light characteristics, including in a configuration specified by the serialization code. In this manner, the light source 252 can be configured to replicate the illumination conditions implemented for obtaining the initial captured image of the good or its unique signature.

The image capture device 254 of the field imaging system 250 can be similar in many respects to the image capture device 224 of the imaging system 220 described above. The image capture device 254 is configured to capture a field image of the good or at least of the portion of the good expected to include the unique signature. For example, the image capture device 254 can be configured to record the light field scattered, reflected, or transmitted by the good when exposed to the light source 252. In some embodiments, the field imaging system 250 includes a peripherally lighted chamber within which the portion of the good including the unique signature can be disposed for imaging. As such, the peripherally lighted chamber can help to optimize the field image captured of the portion of the good according to the serialization code instructions.

In some embodiments, the field imaging system 250 includes a display (not shown in FIG. 2) configured to display an image representative of the field image captured by the image capture device 254. In this manner, a person operating the field imaging system can verify that the field image was captured by the field imaging system 250 consistent with the serialization code instructions.

In some embodiments, the field imaging system 250 is configured to include a handheld device (e.g., a scanner, a Smartphone with camera, a computer tablet, an SMS device) or a portable field device. In some embodiments, the field imaging system 250 includes or is otherwise configured to utilize an adapter or other attachment to a mobile electronic device, such as a phone or tablet, to capture the field image. In this manner, at least a portion of the field imaging system 250 is generally mobile and can easily be transported between and/or around shipping vessels, warehouses, or other locations, for screening goods at various locations in the supply chain or government customs site. In some embodiments, the field imaging system can include a stationary component, such as a flat bed scanner.

The field imaging system 250 is configured to be in electrical communication with the authentication center 260. In some embodiments, the field imaging system 250 is configured to be in wired or wireless communication with the authentication center 260, which can also be a direct or indirect connection. The field imaging system 250 is configured to transmit the field image, or data associated with the field image, to the authentication center 260.

The authentication center 260 of system 200, schematically illustrated in FIG. 2, is configured to verify the authenticity of the good. The authentication center 260 can be similar in many respects to authentication center 160, described above. For example, the authentication center 260 can be configured to verify the authenticity of the good at any specified point in the supply chain. The authentication center 260 is configured to receive information from the field imaging system 250, including, for example, at least one of the field image, data associated with the field image, the serialization code, or instructions associated with the serialization code. The authentication center 260 is configured to be in electrical communication with the database 240 such that the authentication center can query information, such as the captured image data, stored in the database. In this manner, the authentication center 260 can analyze the field image, or data associated with the field image, with respect to the captured image, or data associated with the captured image. For example, the authentication center 260 can analyze data associated with fleck distribution, fleck reflectiveness, fleck or particle color differences and/or distribution, particle distribution, whorl pattern, or another unique feature, or combination of unique features, of a unique signature from a field image against stored data associated with such unique features comprising a unique signature of an authentic good.

Although the authentication center 260 is described as being configured to be in electrical communication with the database 240, in some embodiments, the authentication center 260 can access the captured image data for verifying the authenticity of the good in a different manner. For example, the authentication center 260 can employ use of a check-sum or database downloaded to a field inspector's mobile device (which device can include the authentication center 260). In this manner, the system 200 can be considered to be configured for self-authentication of the good.

The analysis performed by the authentication center 260 includes determining whether the field image is a match to a captured or stored image. The authentication center 260 is configured to determine that the good is authentic when the field image is matched to a stored image, that the good is not authentic if no match is found, or that the analysis regarding authenticity is inconclusive.

The authentication center 260 can be configured to produce a signal indicating a determination of at least one of authenticity, lack of authenticity, or inconclusive as to authenticity, or a combination thereof. In some embodiments, the authentication center 260 is configured to transmit the signal to the field imaging system 250, or to another designated system, that includes the result of the authenticity determination. For example, the authentication center 260 can transmit a signal to the field imaging system 250 that a good is authentic such that an indicia of authenticity (e.g., a green light, a word such as "authentic" or "verified", or other suitable indicia) will appear on the display of the field imaging system.

In some embodiments, the authentication center 260 is configured to transmit information regarding the authenticity determination to the database 240, which information can be stored by the database 240. In some embodiments, the authentication center 260 can include a database (not illustrated in FIG. 2) configured to store a record of each query transmitted to the database 240, each authenticity determination, or both.

In some embodiments, an authentication system according to an embodiment includes a unique signature production system (not illustrated). The unique signature production system is configured to produce or generate at least one unique signature, as described herein. For example, the unique signature production system can be configured to intentionally form, dispose, apply, or otherwise create a unique feature, or a combination of unique features, in and/or on a good. Examples of unique signatures according to embodiments at least one of which the unique signature production system can be configured to produce are described in more detail below.

The unique signature production system is configured to generate a unique signature having a random pattern. The unique signature production system can be configured to generate a unique signature in which at least a portion of the unique signature is three dimensional. In some embodiments, the unique signature production system is configured to generate or otherwise enhance the natural variability or uniqueness of a good, for example, such that the unique features are more visible at a lower magnification and/or resolution.

In some embodiments, the unique signature production system is configured to produce a label including the unique signature. For example, the unique signature production system can be configured to produce a label that includes at least one of flecks, particles, dots, whorls, arches, imprinting, embossing, debossing, or another three-dimensional object or pattern. The system can be configured to distribute such flecks, particles, whorls, arches, imprints, embossing, debossing, or the like, uniquely and/or randomly on the label. For example, the system can be configured to distribute a plurality of substantially planar flecks or particles in a random pattern on a substrate (e.g., the base layer, the adhesive layer, or another suitable portion of the label). In another example, the system can include a printer (e.g., an ink jet printer) programmed or otherwise configured to print a unique pattern of dots or specks onto a portion of the label.

The unique signature production system can be configured to convert a portion of the label into a specified size and/or shape based on the requirements of a brand owner to whose goods the labels will be applied. In some embodiments, the unique signature production system is configured to include a serialization code on or in the label. For example, the unique signature production system can be configured to print the serialization code onto the label before, during, or after converting the label into the specified size and/or shape.

In some embodiments, the label includes a substrate or base layer, and adhesive layer, and a top layer. The base layer of the label can include a web material. The base layer can be paper-based, plastic, fiber, a non-woven material, or another suitable material. The adhesive layer is applied onto the base layer. For example, the web material can be flow coated with an adhesive. The top layer is disposed onto the adhesive layer, thereby being coupled to the base layer. In some embodiments, the unique signature production system is configured to apply the flecks or particles on or in the adhesive layer prior to disposition of the top layer onto the adhesive layer. The flecks or particles can be applied by the unique signature production system in a pattern that is random and unique for each individual label of a batch of labels being processed through the unique signature production system. In some embodiments, at least one of the top layer and the adhesive layer are clear such that the flecks and/or particles area viewable in the label in three-dimensions. In some embodiments, a portion of the top layer disposed over the particles in the adhesive layer will be raised, thus forming a unique three dimensional pattern; i.e., the label's unique signature. The top layer can include a label stock, sometimes referred to as a laminate film, which can be laminated onto the adhesive layer, and thus can protect any flecks and/or particles included in the adhesive layer. In some embodiments, the unique signature production system is configured to apply at least one of a graphic, text, and/or a security feature onto the top layer of the label. For example, the unique signature production system can be configured to apply a hologram to the label. In another example, the unique signature production system can be configured to apply at least one of a text or graphic image, such as that selected or designated by the brand owner, to the label.

In some embodiments, the unique signature production system is configured to apply a coating onto at least a portion of the top layer. For example, the unique signature production system can be configured to apply an ultraviolet coating on the top layer of the label. The unique signature production system can be configured to apply particles to the coating. For example, the unique signature production system can be configured to apply or otherwise dispose fluorescent particles in or on an ultraviolet coating. The coating applied by the unique signature production system can also serve to protect the label and/or enhance a graphic on the label.

Although the unique signature production system is described as being configured to apply the flecks or particles to the adhesive layer of the label, in some embodiments, the unique signature production system is configured to apply the flecks or particles to a different portion of the label. For example, the unique signature production system can be configured to apply the flecks or particles onto the top layer or laminate. In another example, the unique signature production system can be configured to apply the particles to the base layer, or a combination of the base layer, the adhesive layer, and/or the top layer or laminate. In still another example, the unique signature production system can be configured to apply the flecks or particles directly onto the good.

In some embodiments, the unique signature production system can be configured to generate a three dimensional unique signature that includes a three dimensional pattern of whorls and arches, such that the three dimensional pattern is a flow-like pattern having an appearance generally similar to a human fingerprint. The unique signature production system can be configured to form the three dimensional pattern of whorls and arches in a coating on a surface of a good, such as a label. For example, in a label production process similar to that described above with respect to generation of a three-dimensional pattern using flecks or particles, the unique signature production system is configured to apply a coating onto the label. In some embodiments, the unique signature production system includes a printer configured to apply the coating, such as using a flexographic printing process. The unique signature production system applies a stream of forced gas (e.g., air) to the overcoat such that the stream pressure forms the whorls and arches in the coating, which has not been fully dried and/or cured, thereby generating a three dimensional pattern with unique granular details and shadow patterns. Such details and shadow patterns will not be visible in a photocopy of the flow-like unique signature, for example, because the photocopier will be unable to detect and reproduce the granular details and/or because the light of the photocopier will distort the shadow patterns. In some embodiments, the three dimensional flow-like pattern is readily visible with indirect illumination. In some embodiments, the unique signature production system is configured to cure the coating (e.g., using ultraviolet light) after generation of the three dimensional pattern, for example, when an ultraviolet coating was applied to the label.

In some embodiments, the unique signature production system can be configured to emboss (e.g., form a raised design or pattern, such as that formed by being molded in relief) and/or deboss (e.g., form a three dimensional design or pattern indented into a surface) at least a portion of the unique signature onto or in a portion of the good.

In some embodiments, the unique signature production system can be configured to generate a unique signature that includes an ink printed or otherwise disposed on a surface of a good by the unique signature production system. For example, in some embodiments, a brand name or drug identification code is printed onto a pharmaceutical unit. Unique patterns will form at the edges of the lettering and/or numbering printed onto the pharmaceutical unit, which can be used as the unit's unique signature. Additionally, in some embodiments, the unique signature production system can be configured to apply the ink to the pharmaceutical unit (or other good) in a manner such that the ink forms a three dimensional pattern on a surface of the unit (or good). In some embodiments, the unique signature includes a color-shifting ink, which helps to deter copying because the ink will appear as a different color in a photocopy, especially in view of a particular lighting configuration that may be specified by a serialization code associated with the good.

The unique signature produced by the unique signature production system can be imaged by an imaging system of the authentication system, as described above with respect to systems 100, 200.

Figure 4A:
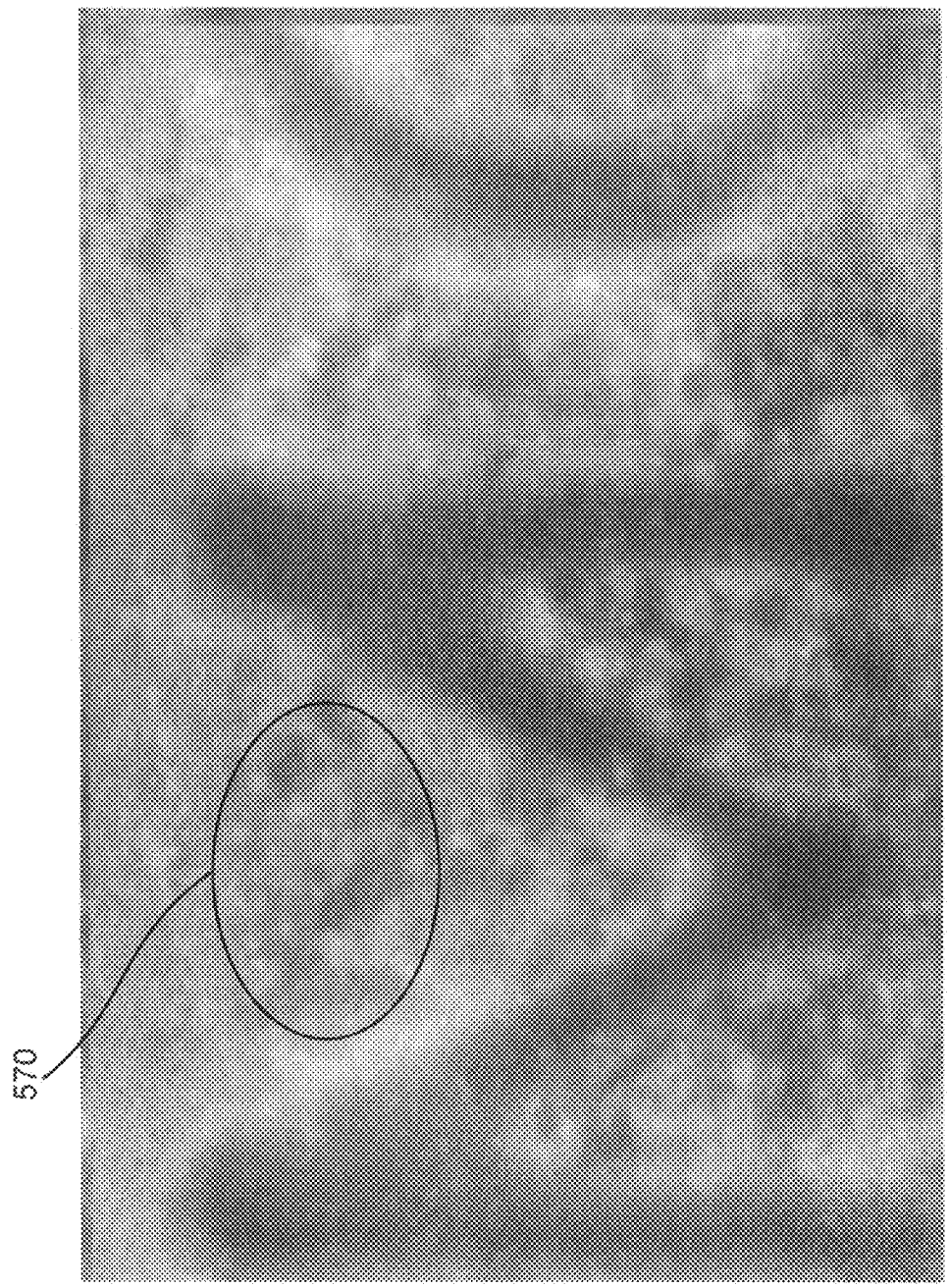
FIGS. 4A and 4B are images of a pharmaceutical tablet having unique features that can be included in a unique signature for each tablet according to an embodiment.
Figure 4B:
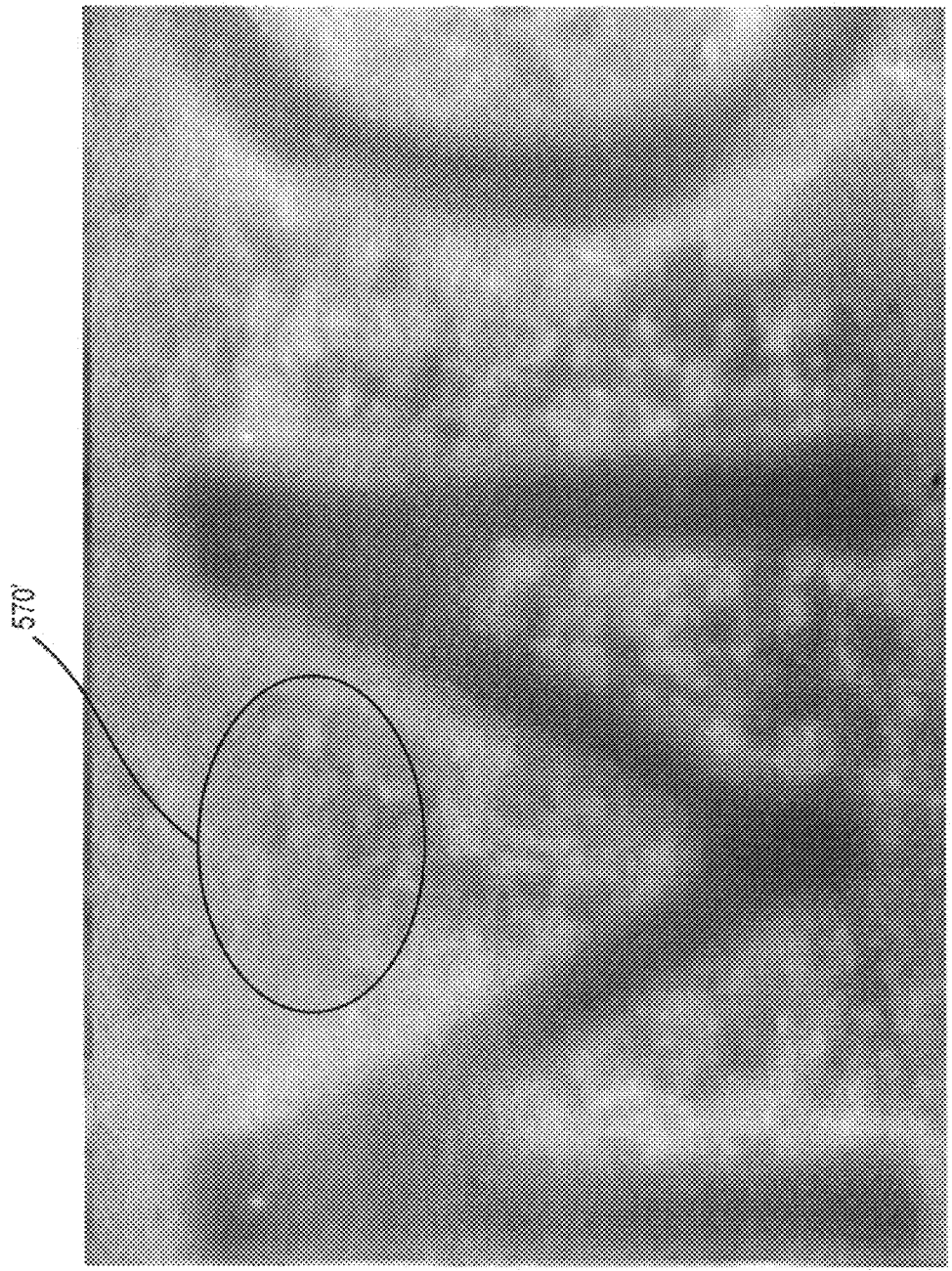

Referring to FIGS. 4A through 10D, various unique signatures according to embodiments are contemplated. As noted above, the unique signature can include a unique structural feature in and/or on the good, such as a feature that is inherent to the material from which the good is constructed or a feature that is unintentionally formed during the manufacturing process. For example, FIGS. 4A and 4B are magnified images of a portion of a surface of a first pharmaceutical tablet and corresponding portion of a surface of a second pharmaceutical tablet, respectively. The first tablet and the second tablet are each produced using the same or similar materials. Intrinsic variations in the surface of the first tablet from the surface of the second tablet are observable (and have been identified, as an example, by reference numbers 570 and 570', respectively). Corresponding portions 570, 570' of the first and second tablet have varied patterns of lightness and darkness on their respective portions, which may be used as the unique signatures of the respective tablets.

Figure 5:
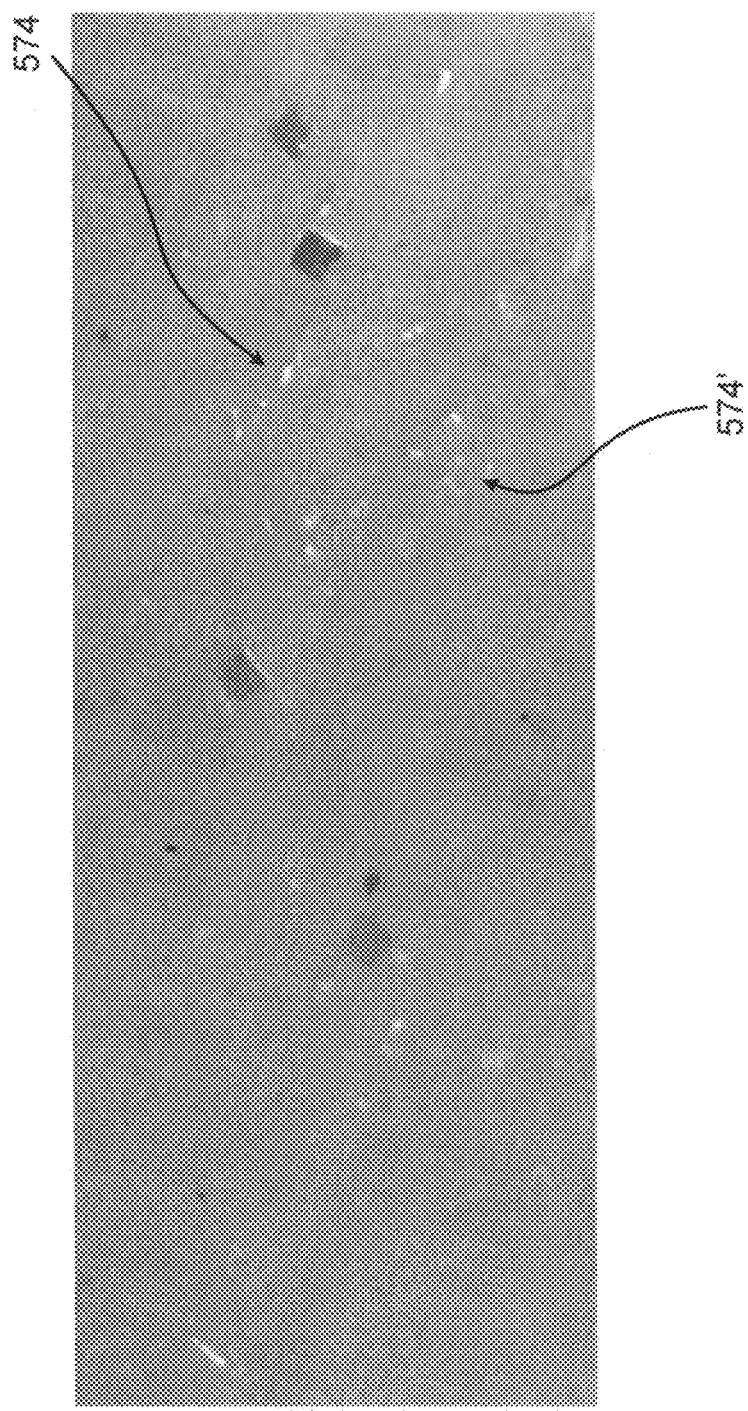
FIGS. 5-6 are images of portions of labels having unique features that can be included in unique signatures according to embodiments.

In another example, FIG. 5 is a photograph of a label including unique variations 574, 574' formed by bubbling in at least one of coating of the label or between layers of the label. Because the unique features are formed or identifiable as a by-product of the manufacturing process, an existing manufacturing system for a particular good can be or include the unique signature production system 310. An imaging system described herein (e.g., imaging system 120, 220, 250) can be configured to detect and characterize such natural or intrinsic unique features of such unique signatures.

Figure 6:
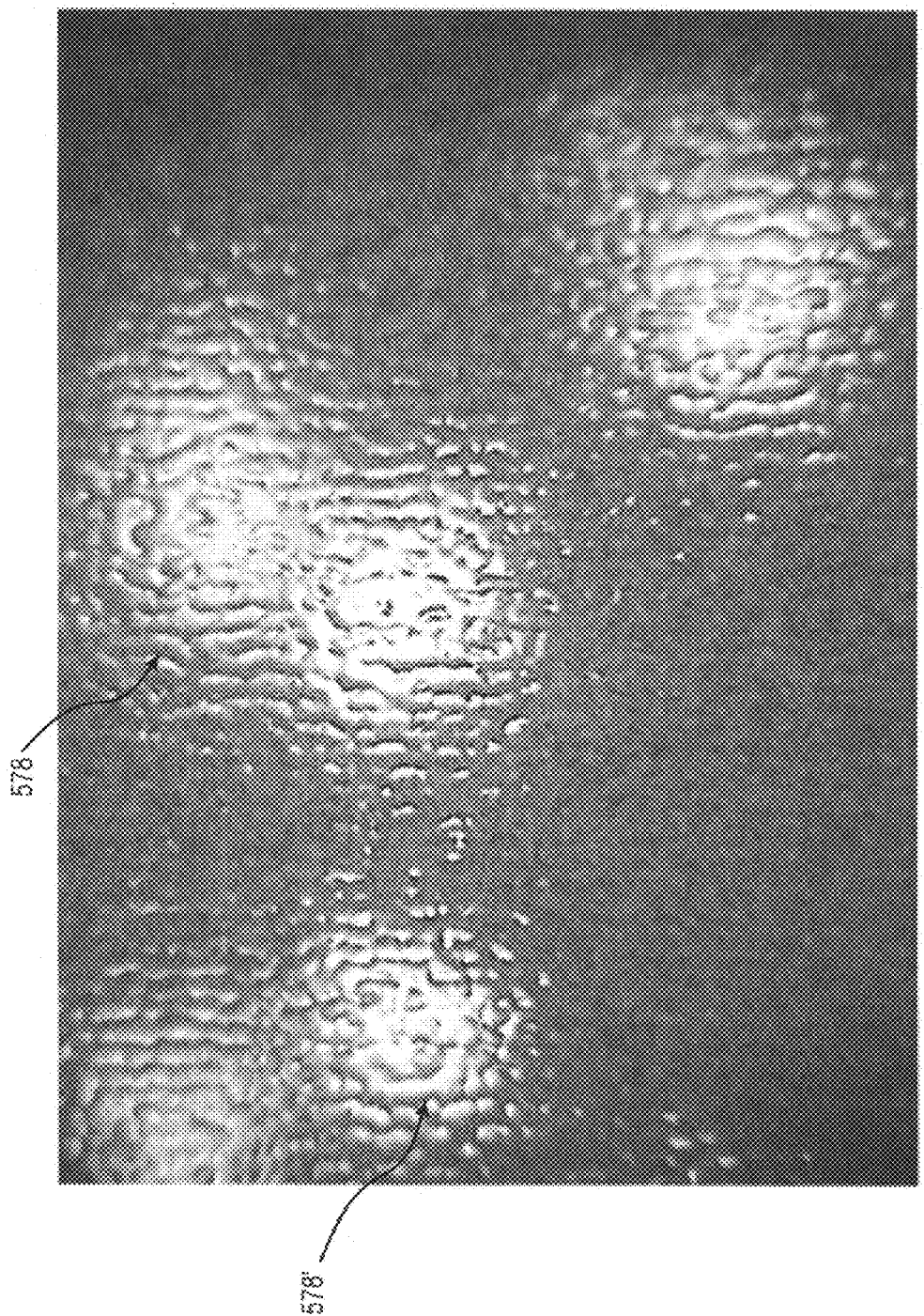

Referring to FIG. 6, in some embodiments, a unique signature is a flow-like pattern. The flow-like pattern can includes random arches and whorls, generally identified as reference numbers 578 and 578', distributed on at least a portion of a good. At least a portion of the flow-like pattern is three-dimensional. As such, light (e.g., from a light source of an imaging system described herein) can create shadows based on the flow-like pattern and the lighting configuration used to illuminate the signature. In this manner, the unique signature will exhibit identifiable metrics when imaged with an imaging device according to a specified lighting configuration. The flow-like pattern can be formed using any suitable process, including a process described herein.

In some embodiments, a unique signature includes flecks or particles disposed or dispersed on the good or label (e.g., in a random pattern). The flecks or particles can be disposed on the label, for example, in a constellation-type random pattern. In some embodiments, at least a portion of the flecks can be different colors or multi-colored. In some embodiments, at least a portion of the flecks or ink printed dots are reflective. For example, in some embodiments, at least a portion of the flecks or ink printed dots include a reflective metallic material. In this manner, the characterization of the unique signature by an imaging device (e.g., imaging device 120, 220, 250) will be affected by the light configuration applied to the signature when the image is captured or recorded based on the color and/or reflectiveness of the flecks or particles. For example, a unique signature including metallic flecks will reflect a first amount of light in a first reflective pattern when exposed to a first lighting configuration and a second amount of light in a second, different, reflective pattern when exposed to a second lighting configuration different than the first lighting configuration. Additionally, the flecks or particles can be three-dimensionally disposed on or embedded in the label, which will also affect the characterization of the unique signature.

Figure 7A:
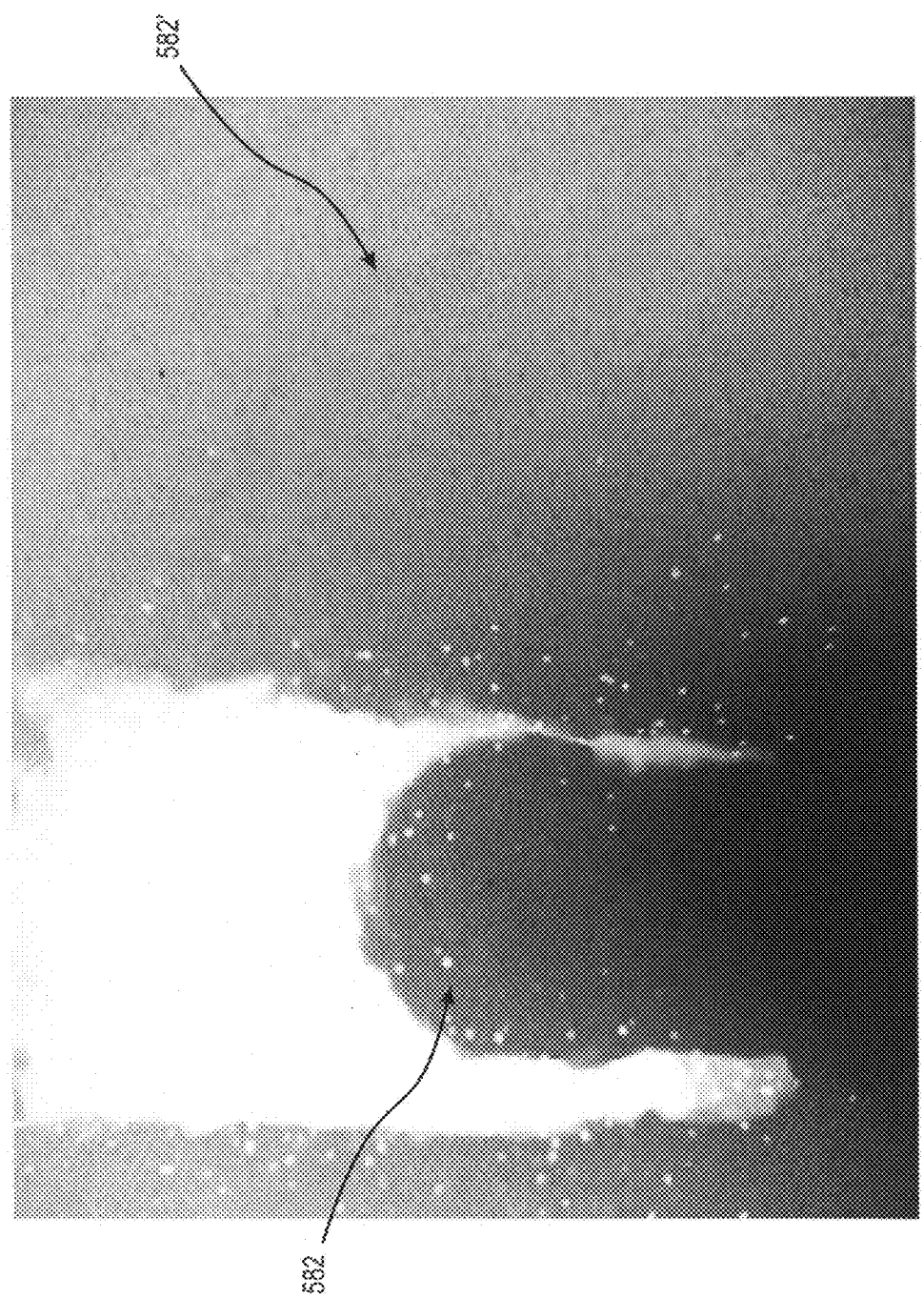
Figure 8A:
Figure 8B:
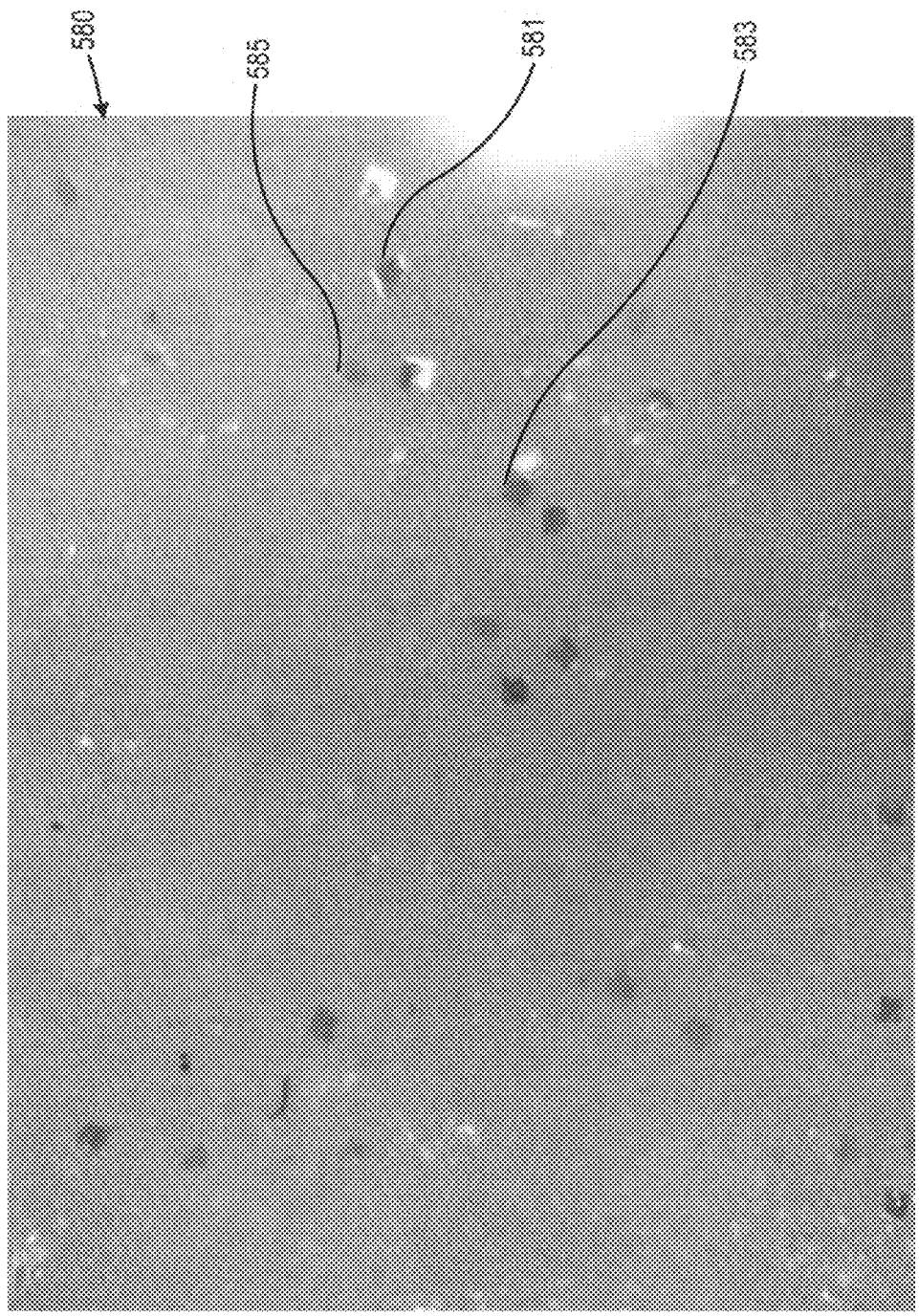
Figure 9B:
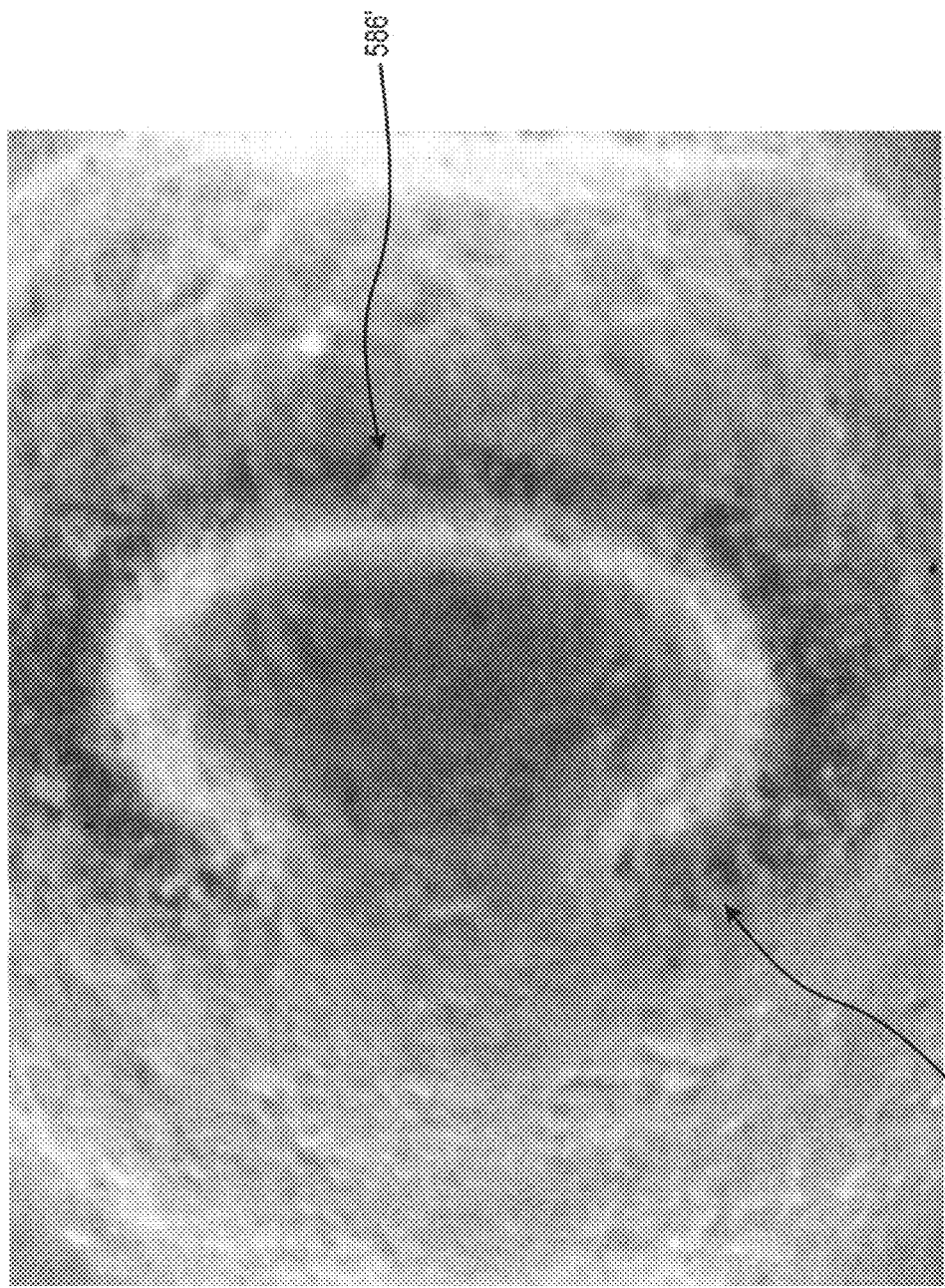
Figure 9C:
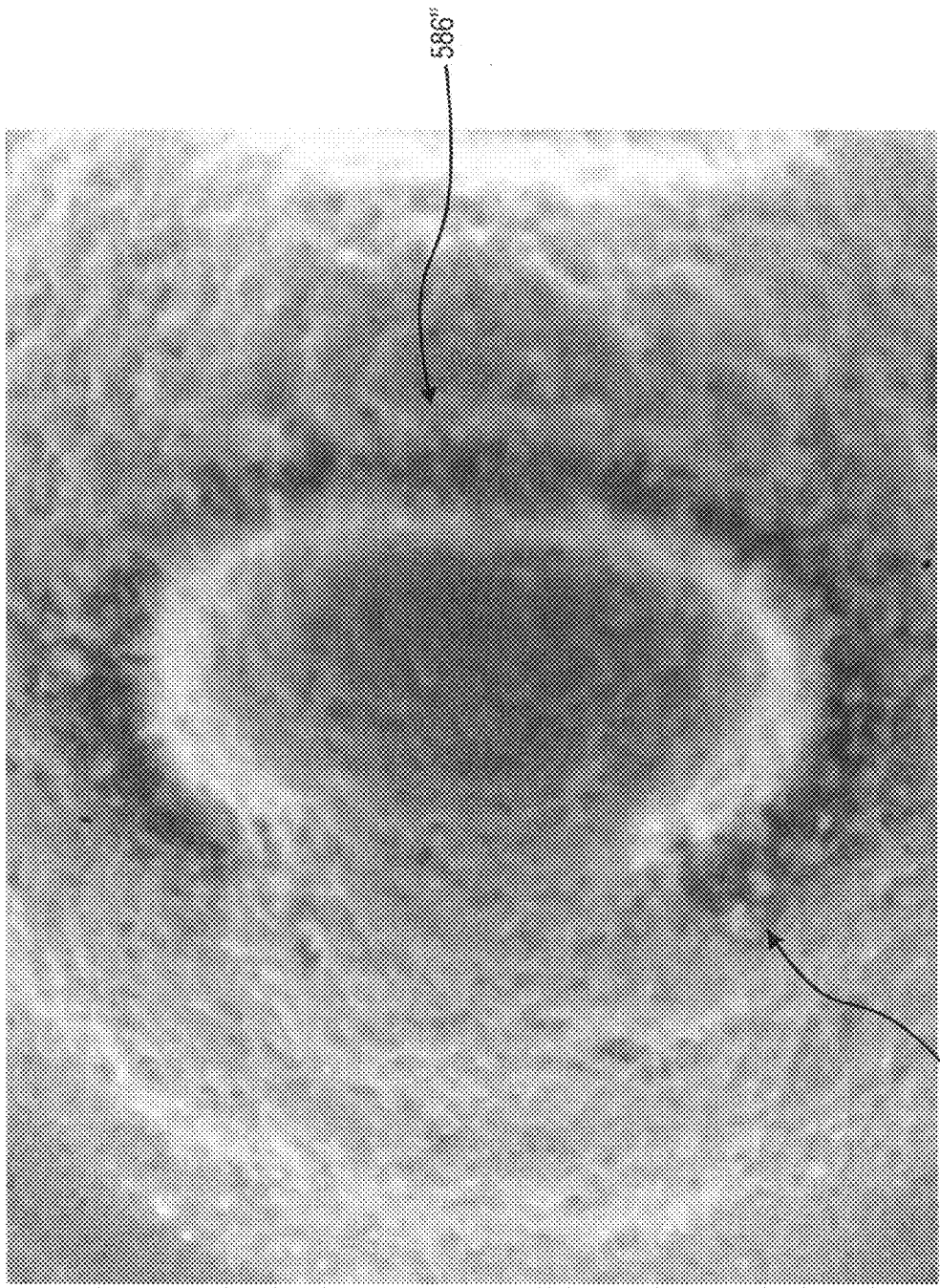
Figure 9D:
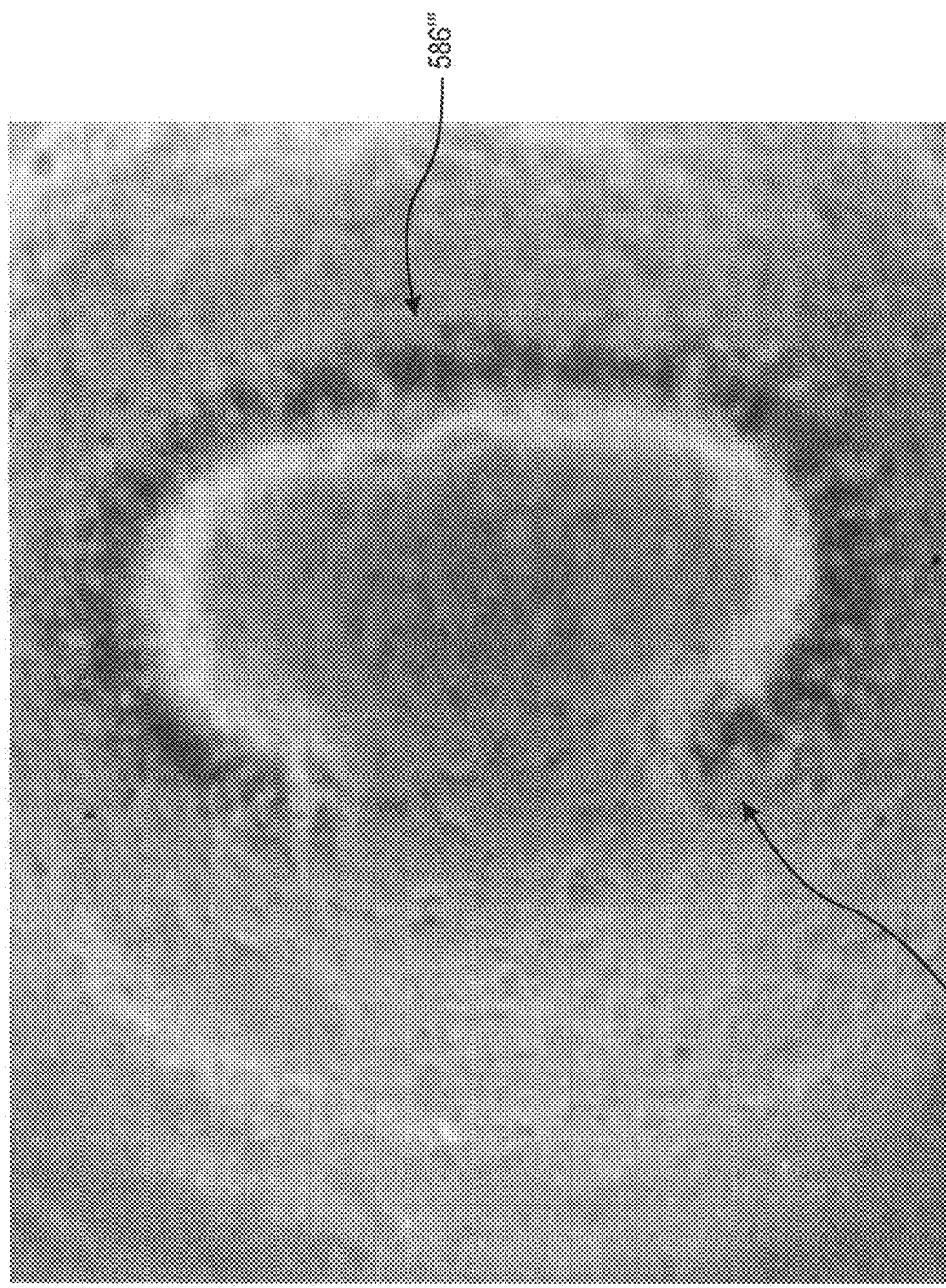
Figure 10A:
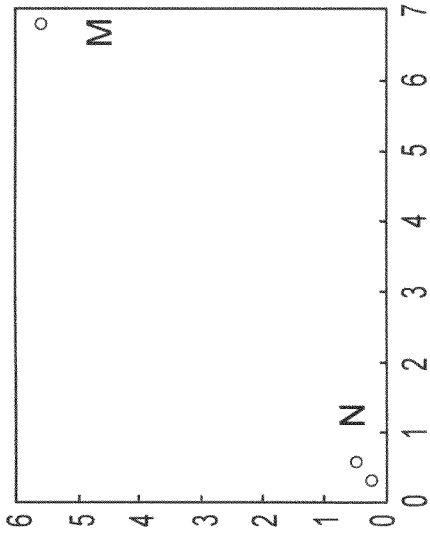
FIGS. 10A-10D are illustrations of two-dimensional metrics based on the unique signature associated with the images of FIGS. 9A-9D, respectively.
Figure 10B:
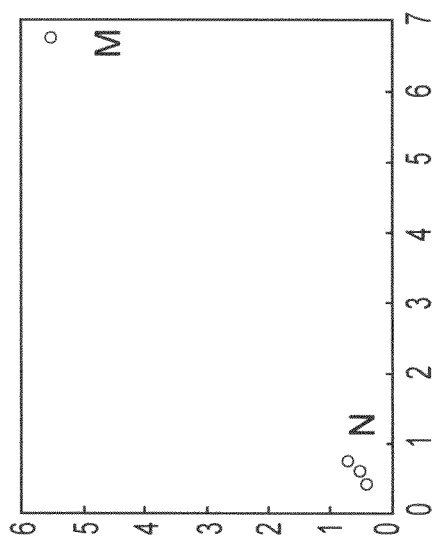
Figure 10C:
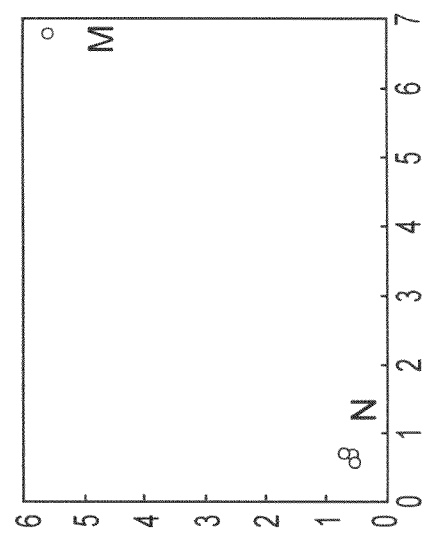
Figure 10D:
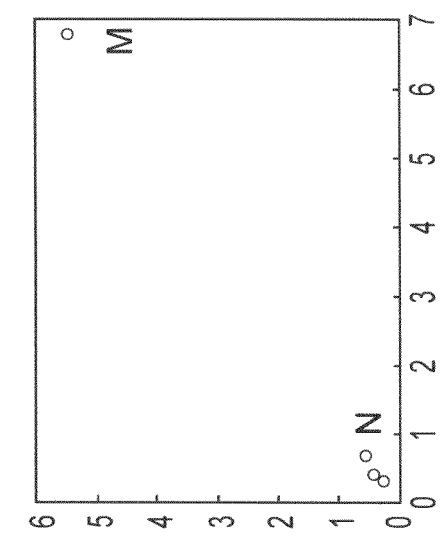

Referring to FIGS. 7A and 7B, a first label and a second label, respectively, each have a unique signature according to embodiments that includes multi-colored flecks (or particles) (e.g., flecks 582, 582', 584, 584') three-dimensionally and randomly disposed in the respective label. The multi-colored flecks can include a first individual fleck having a color different than the color of a second individual fleck. For example, the multi-colored flecks can include a green fleck, a red fleck, a dark blue fleck, a light blue fleck, a gold fleck, a fleck of another color, or any combination of the foregoing. In some embodiments, an individual fleck of the multi-colored flecks can have more than one color. In other words, each individual fleck can be multi-colored. Each fleck of the multi-colored flecks will have and/or reflect a given color, vividness, intensity, or the like, based on the lighting configuration used to illuminate the signature for imaging. Additionally, flecks in the label can have a different appearance based on the magnification used (e.g., by the imaging device) to read the unique signature of the label. For example, referring to FIGS. 8A-8C, a label 580 having a unique signature according to an embodiment is shown at 10×, 30×, and 50× magnification, respectively. The unique signature includes flecks 581, 583, 585 (identified in FIGS. 8B and 8C), which have a different appearance to an imaging device, or to an authentication system, at the different magnifications. In some embodiments, the first fleck 581 is a first color, the second fleck 583 is a second color different than the first color, and the third fleck 585 is a third color different than the first and second colors. For example, the first fleck 581 can be blue, the second fleck 583 can be red, and the third fleck 585 can be yellow. A fleck used in the unique signature can be of any suitable color or combination of colors, and the plurality of flecks can include any suitable combination of colored or multi-colored flecks.

The plurality of flecks included in the unique signature enable multiple layers of anti-counterfeiting protection or security. A first layer of security is associated with verification of the distribution of flecks. In other words, a unique signature can be verified based on the presence of a fleck or flecks at a known x-y coordinate(s) when the distribution of flecks is associated with an x-y axis. A second layer of security can be based on verifying the color distribution of the flecks on the x-y axis. A third layer of security can be based on a light reflective pattern of the distribution of flecks using a pre-determined lighting configuration, as described in more detail herein. Accordingly, a single unique signature can provide multiple authentication layers, and thus multiple levels of security.

The label can be laminated to retain the flecks on the label, or label film. The label can be constructed of any suitable material, including, for example, a clear polyethylene or polypropylene. More specifically, in some embodiments, the label is constructed of clear polyethylene and/or polypropylene film approximately 1 millimeter in thickness.

In some embodiments, a unique signature includes particles randomly disposed in or on a label (or good). As such, the particles can form a random three-dimensional pattern that includes unique features which can comprise the unique signature. The particles can be applied to a label, for example, by the unique signature production system as described in detail above. The particles can include any suitable substance, including, for example, silica, sand, glass, or the like. In some embodiments, the particles can be photoluminescent (e.g., fluorescent or phosphorescent).

In some embodiments, a unique signature includes unique features formed by embossing or debossing a letter, number, or other character in a good. For example, FIGS. 9A-9D are images centered at a debossed C of a first, second, third, and fourth pharmaceutical tablet, respectively. In FIGS. 9A-9D, each image is magnified at 50×. Variations are visible in each debossed C (e.g., in the thickness and boundary shape of the lettering and/or patterns of light and dark in and/or around the lettering), as generally indicated in each of FIGS. 9A-9D by reference numbers 586, 586', 586", 586''', respectively, and 588, 588', 588", 588''', respectively. FIGS. 10A-10D are two-dimensional metrics shown on an x-y axis based on the characterization of each of the unique signatures imaged in FIGS. 9A-9D, respectively. In some embodiments, for example, when the unique signature of the good captured in the images of FIGS. 9A-9D were characterized, information associated with at least one unique feature comprising each of the unique signatures was detected by an imaging system (e.g., imaging system 120, 220). The information associated with the unique feature(s) was converted into coordinates on each of an x-axis and a y-axis taking into account specified variables, which can include, for example, a spatial position of the unique feature in the image, distribution or relative positions of two or more unique features in the image, at least one lighting characteristic noted above (e.g., number of lights, wavelength, polarization, etc.), a level of magnification or zoom at which the image was captured, or another specified variable. The coordinate of the unique features can be with reference to the position of a fiducial mark. The fiducial mark is a reference point or mark on the good or label used to identify the location of the unique signature. For example, the fiducial mark can be a pre-determined corner of a label. In another example, the fiducial mark can be part of the printed material on the label. In this manner, only a portion of the label or good need be analyzed for verification of the unique signature. Accordingly, the imaging algorithm used to analyze the unique signature can be less complex than that needed for verifying a unique signature without a reference point.

In some embodiments, a unique signature includes unique features formed by printing, embossing, or debossing, a letter, number, symbol, or other character (referred to in this paragraph as "character") onto a label of a good. For example, in some embodiments, a repeating pattern including a character, or combination of characters, can be printed onto an oral film substrate. When the oral film substrate is cut to form oral thin film strips, the placement of the printed characters can be different for each strip. Additionally, the weight, thickness, density, and/or another aspect of the lines forming the characters may be different for each character (on a single oral thin film strip and/or amongst the oral thin film strips formed from the substrate).

In some embodiments, a label including a unique signature is configured to be readable and/or able to be imaged by an imaging system when the label is disposed on a curved, irregular, or otherwise non-planar surface of a good such that the portion of the label including the unique signature at least partially complies with the curved, irregular, or otherwise non-planar surface. For example, a label can be configured to be applied to curved surface of a good, such as a vial, syringe, canister tube, or the like. Prior to taking a field image of the label, the portion of the label including the unique signature should first be returned to the shape and/or position it was in at the initial reading and/or imaging, such as a planar configuration that the label may have been in when the unique signature of the label was initially read and/or imaged (e.g., before the label was applied to the good). As such, in some embodiments, at least a portion of the label including the unique signature is detachable (e.g., can be peeled away from the good without damaging the label and without the use of any adhesive removal aids) from a good. In this manner, the portion of the label including the unique signature can be detached from a curved or other non-planar surface, permitting the portion of the label including the unique signature to be flattened, or otherwise positioned, for being read and/or imaged with an imaging device (e.g., any imaging device described herein).

In some embodiments, a label is configured such that at least a portion of the label including a unique signature will remain in its initial imaging configuration after the label is applied to a good. For example, a first portion of the label, which includes the unique signature and which is imaged in a flat or substantially planar configuration, can be configured to remain in a flat or substantially planar configuration when a second portion of the label is applied to a good such that the second portion of the label complies with a curved, irregular, or otherwise non-planar, surface of the good. In a specific example, a label includes a first portion configured to be positioned over a flat portion of an end of a cylindrical tube such that the first portion remains substantially flat and a second portion extending from the first portion and configured to be positioned on a curved surface of the side of the tube. The unique signature can be included in the first portion of the label, positioned at the flat end of the tube.

In some embodiments, a set of labels includes two, three, four, or more labels, each label of the set including its own respective unique signature. The set of labels is configured to be applied to a good, and each unique signature of the labels in the set (i.e., the plurality of unique signatures) can be associated with the good. At least one of the labels is detachable from the good. In this manner, a first label of the set, and its respective unique signature, can be removed from the good for obtaining a field image of the unique signature of the good. As the good continues to be moved through the supply chain, another'(or second) label of the set of labels can be removed and imaged for a subsequent field image. In some embodiments, the set includes a stack of labels in which at least one label of the stack is positioned at least partially on or over another label of the stack. As such, when the at least one label of the stack is removed, at least a portion of another label of the stack is revealed.

For additional security, a label including a unique signature according to an embodiment can be combined with one or more additional security features on the good or on the packaging for the good.

Figure 3:
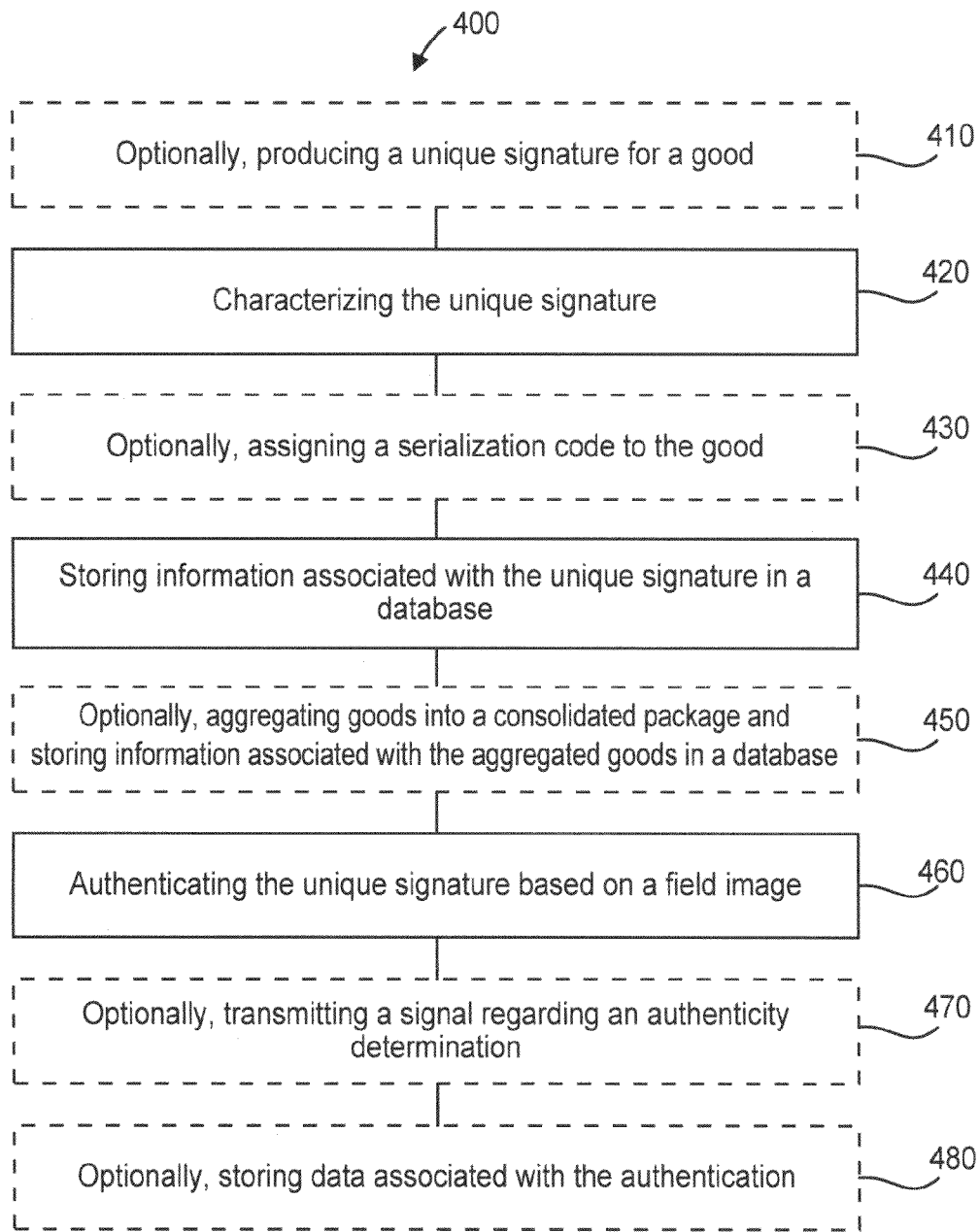
FIG. 3 is a flowchart of an authentication method according to an embodiment.

FIG. 3 is a flow, chart of method 400 for tracking and authenticating a good according to an embodiment. The authentication method can be performed, for example, using at least a portion of an authentication system described herein (e.g., authentication system 100, 200).

At 410, the method 400 optionally includes producing or generating a unique signature for a good. The unique signature generated can be any unique signature described herein, including, for example, those generated as described above with respect systems 100 or 200 and with respect the unique signatures illustrated in and described with respect to FIGS. 4A-10D. In some embodiments, generating the unique signature includes generating, or otherwise forming and applying onto (or forming on) a good, a three-dimensional unique signature. Generating the unique signature can include randomly dispersing one or more flecks or particles in or on a good. The flecks or particles can be disposed in a unique and random pattern. In some embodiments, the one or more particles are disposed on an intermediate layer of a good, such as, for example, an adhesive layer of a label. In some embodiments, the one or more particles are disposed in or on a coating of a good. In another example, generating the unique signature can include forming a unique and random pattern of whorls and arches, similar in many respects to a human fingerprint, on the good. In other examples, generating the unique signature can include embossing, debossing, or printing an ink onto a good or label. A unique signature generated according to method 400 can include any suitable combination of one or more of a fleck, particle, flow pattern, embossing, debossing, and ink.

At 420, the method 400 includes characterizing the unique signature. In some embodiments, characterizing the unique signature includes capturing an image of the unique signature. For example, an image of a three-dimensional unique signature can be captured in a manner that unique features associated with the three-dimensional structure of the unique signature are captured by an imaging device, which can be an imaging system similar in many respects to an imaging system described herein (e.g., imaging system 120, 220). In some embodiments, characterizing the unique signature includes processing the captured image. Processing the captured image can include running an algorithm configured to detect unique aspects of the unique signature in the captured image. For example, the processing can include detecting the distribution of particles in a unique signature, the size of particles in a unique signature, elevation of the particles in a unique signature with respect to a surface of the good, or other unique aspects related to the particles in a unique signature. In another example, the processing can include detecting whorls, arches, valleys, or other unique aspects related to a three-dimensional flow-like unique signature. In another example, the processing can include detecting unique aspects of a natural three-dimensional topography of a good. In some embodiments, the unique signature is at least partially characterized in a processor included in the imaging system 120 or 220, described above. In some embodiments, the unique signature is at least partially characterized in a processor similar in many respects to processor 230, described above. The characterized unique signature, which can include the captured image and the unique features detected according to one or more metrics of the imaging system, can be electrically transmitted to a processor of the authentication system, such as processor 230 of authentication system 200 described above.

At 430, the method 400 optionally includes assigning a unique identifier or serialization code to at least one of the good, the captured image, or at least a portion of the characterized unique signature. At 440, the method 400 includes storing information associated with the unique signature of the good in a database. The storing can include storing in the database information associated with the characterized unique signature and the unique identifier or serialization code.

At 450, the method 400 optionally includes aggregating two or more goods into at least one consolidated package. For example, in some embodiments, two or more goods, each of which has its own unique signature can be consolidated into a carton. The consolidation can occur following characterization of at least one unique signature of one or the goods. In some embodiments, at least one of steps 410 through 440 of method 400 is performed with respect to the consolidated package (e.g., a carton, pallet, or the like). In this manner, the consolidated package is given a unique signature, which can be characterized, and for which data can be stored in the database, and any goods within the consolidated package can also retain their own respective unique signature that was previously characterized and for which data has been stored. For example, at the carton or pallet packaging level, a larger, label(s) having a unique signature(s) according to embodiments can be disposed on at least one of a side, bottom, or over an opening in the top of the carton or pallet. The larger label(s) can include fluorescent flecks, which can be more readily viewable using ultraviolet light.

In another example, two or more goods and/or two or more consolidated packages, any or all of which can have a unique signature characterized according to step 430, can be further aggregated into a consolidated package (e.g., a pallet, a trailer, or the like), and at least one of steps 410 through 440 of method 400 can be performed with respect to the consolidated package. At least one of steps 410 through 440 of method 400 can be performed for each level of aggregation of two or more goods into a consolidated package. The assigned serialization code of a good can be electronically linked to each level of packaging in which the good is disposed or packaged. For example, the assigned serialization code of the good can be electronically linked with a serialization code assigned to the carton, the shipping case and/or pallet. As such, this aggregation link, and resulting capability to associate supply chain scanning events (i.e., field imaging events) at an aggregated packaging level with the unique signature of a particular good within the aggregated packaging, enables a brand owner or other entity to scan the serialization code of any level of packaging to track the chain of custody of all levels of packaging down to the unit level of the good (e.g., unit dose package) including the unique signature. Aggregated packaging levels may also include additional security measures, including, for example, conductive traces, pressure sensitive radiofrequency identification tags, pockets filled with at least one of neon or argon, invisible ink, or any suitable combination of the foregoing.

At 460, the method 400 includes authenticating the unique signature of the good. The authenticating can include interrogating the unique signature of the good, which can include scanning, or otherwise capturing, a field image of at least a portion of the good where the unique signature is expected to be located. For example, in some embodiments, a label of the good is scanned. In another example, the portion of the good and/or label to be scanned can be determined by the position of a fiducial mark. The good can be scanned using a scanner described herein (e.g., field imaging system 250). The good can be scanned using a lighting configuration set forth in instructions in the serialization code. For example, the serialization code can include information or instructions as to the position of the fiducial mark on the good or label, and/or the position of the unique signature with respect to the fiducial mark. In some embodiments, the good is scanned in a peripherally lighted chamber of the scanner such that light from a light source is directed at the good at a predetermined angle of incident.

Interrogating the good includes analyzing the field image with respect to at least the portion of the characterized unique signature stored in the database. In some embodiments, the analysis includes executing a visioning algorithm for the field image and comparing the metrics identified by executing the visioning algorithm with metrics associated with the characterized unique signature stored in the database. In some embodiments, the visioning algorithm is configured to subtract dark current from the field image. The visioning algorithm can be configured to convert the field image to grayscale. The visioning algorithm can be configured to normalize the field image. The visioning algorithm can be configured to apply a comparison algorithm to identify specified metrics (e.g., with reference to a fiducial mark). The specified metrics, for example, can be related to a position of a unique element or feature of the three-dimensional unique signature as represented in a two-dimensional metric space (e.g., on an x-y axis). The metrics of the field image can be compared to metrics associated with the characterized unique signature and stored in the database. In some embodiments, interrogating the good includes transmitting the field image to an authentication center, such as an authentication center described herein (e.g., authentication center 260), for performing the analysis. In some embodiments, interrogating the good includes making an authenticity determination for the good based on the analysis.

At 470, the method 400 optionally includes transmitting a signal regarding the authenticity determination. For example, a signal can be transmitted that indicates the good is authentic, that a good is not authentic, or that authenticity of the good is inconclusive. In some embodiments, the signal is transmitted to the scanner used to image the good for interrogation such that the scanner can display a message relating to the good's authenticity. In some embodiments, the signal is electronically transmitted to at least one of a computer in communication with the authentication center, a computer registered or otherwise designated to receive signals regarding authenticity determinations for specified categories of goods (e.g., pharmaceuticals, goods bearing a certain brand or official license, etc.), a mobile device (e.g., a Smartphone, a tablet, an SMS device), or to another suitable device. In some embodiments, the signal can be transmitted to at least one of a manufacturer of the good (or a manufacturer of a genuine good being copied in the event of a counterfeit good), a customs authority, a shipper, an importer, and exporter, a wholesaler, a retailer, or to another predetermined recipient.

The good can be interrogated, and the signal related to the authenticity determination can be transmitted, at any suitable point during distribution of the good from a manufacturer to an end-user (the supply channel). As such, the good can be authenticated and traced throughout its movement through the supply chain. For example, the good can be scanned at one or more of a shipping facility, a customs facility, a warehouse, a wholesaler, a retailer, a pharmacy, or another suitable location. In some embodiments, a good can be interrogated once, twice, three, four or more times as the good is being moved through the supply chain.

Additionally, the method 400 optionally includes performing steps 460 and 470 for more than one packaging level. For example, a customs official can efficiently interrogate the good at a pallet or trailer consolidated packaging level. If, however, the customs official desired further verification of the authenticity of the goods being imported and/or exported, the customs official could efficiently interrogate a good at a lower consolidated packaging level (e.g., the carton level) or at an individual good level.

At 480, the method 400 optionally includes storing data associated with the authentication (or interrogation). For example, in some embodiments, data is associated with at least one of the field image, metrics associated with the field image, the analysis of the field image and/or metrics of the field image with data stored for the characterized unique signature(s), the determination of authenticity, or any combination of the foregoing. In some embodiments, at least a portion of the data associated with the interrogation is stored in the same database as the data stored for the characterized unique signature.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, although the method 400 is illustrated and described as assigning a serialization code to the good after characterizing the unique signature of the good, in other embodiments, the assigning and characterizing can occur concurrently. In another example, the assigning can occur before the unique signature is characterized. In such an embodiment, the method 400 can optionally include reading and processing the serialization code concurrent with reading and processing the unique signature. Thus, the breadth and scope of the invention should not be limited by any of the above-described embodiments. While the invention has been particularly shown and described with reference to specific embodiments thereof, it will be understood that various changes in form and details may be made.

For example, although the unique signature has been described above as being unique per individual good, label, or unit of sale, in some embodiments, the unique signature can be unique to a set of goods. For example, a particular unique signature can be applied to a set of similar goods, such as to a group of pharmaceutical tablets for a particular drug, a particular dosage, and/or to a pharmaceutical unit produced at a particular manufacturing facility.

Although the unique signature production system has been illustrated and described herein as being a single device, in other embodiments, a unique signature production system can be a system of any suitable number and type of devices, including, for example, two, three, or more different machines, processors, systems, or the like.

Although the computing device 230 has been illustrated and described herein as being configured to assign the code to the good before the unique signature of the good is characterized by the imaging device 220, in some embodiments, the computing device 230 is configured to assign the code to the good concurrent with or subsequent to the image capture. For example, the computing device 230 can be configured to assign a serialization code to the good based on the order in which an image of the good is processed by the imaging device 220 with respect to other goods.

In some embodiments, the computing device 230 is in electrical communication with the unique signature production system. As such, the computing device 230 can be configured to transmit data to the unique signature production system. For example, the computing device 230 can be configured to transmit data associated with the pre-assigned serialization code to the unique signature production system. The unique signature production system can receive the data transmitted from the computing device 230 and, in some embodiments, print at least a portion of the code onto the good, as described above.

In some embodiments, the computing device 230 is configured to receive data from the unique signature production system. For example, the unique signature production system can transmit data to the computing device 230 confirming that a serialization code was applied or printed onto a good. In another example, the computing device 230 can receive data related to a serialization code, for example, if at least a portion of the serialization code was generated by the unique signature production system. The computing device 230 can then associate the received code with the captured image when the image is received by the processor from the imaging system 220.

In another example, although the computing device 230 is schematically illustrated in FIG. 2 as being a component of the authentication system 200 separate from other components of the authentication system, in some embodiments, the computing device is included in another component of the authentication system. For example, in some embodiments, the computing device (or at least a processor of the computing device) 230 is included in the unique signature production system. In another example, in some embodiments, the computing device 230 can be included in the imaging system 220. For example, a single processor can include or be configured to act as an image processor of imaging system 220 and the computing device 230, and can be configured to execute multiple algorithms (e.g., a visioning algorithm and a serialization algorithm).

In some embodiments, an imaging system described herein (e.g., imaging system 120, 220, 250) is configured to image and characterize the unique signature when the unique signature is disposed on or about a non-planar surface. For example, when the unique signature is included in a label disposed on a curved surface of a good. The imaging system can be configured to execute a de-convolution algorithm to account for displacement of the unique signature attributable to being disposed on or about the non-planar surface. In this manner, an image of the unique signature taken on the non-planar surface (e.g., a field image of a label on a tubular good) can be matched, e.g., by an authentication system described herein (e.g., authentication system 160, 260), with an image of the unique signature taken when the unique signature was disposed on a planar surface (e.g., an initial image of a label, before being applied to the good).

Although the authentication systems (e.g., authentication system 100, 200) have been illustrated and described as including one database (e.g., database 140, 240), in some embodiments, an authentication system includes two, three, four, or more databases. In some embodiments, a database system includes a plurality of databases, or storage devices, each of which can be associated with a specified category of goods. For example, a first database can be associated with pharmaceutical goods and a second database can be associated with consumer goods. In some embodiments, each database is associated with a specified manufacturer, contract packager, licensing authority, group of manufacturers, or group of licensing authorities. For example, a first database can be associated with pharmaceutical manufacturers and a second database can be associated with consumer goods manufacturers. In another example, a first database can be associated with a first pharmaceutical company and a second database can be associated with a second pharmaceutical company (e.g., a contract packager) different than the first pharmaceutical company. In some embodiments, an authentication system includes a first database configured to store reference data and a second database configured to store verified data. An authentication system according to an embodiment can include any suitable number and combination of the foregoing databases.

In addition to determining that a good is counterfeit, an authentication system according to an embodiment described herein can be configured to image and characterize unique features of counterfeit items to assist in cataloguing data that may be used to identifying a manufacturer of the counterfeit goods, or other party (or parties) involved in the distribution of the counterfeit goods, as well as localizing a source of counterfeiting and/or diversion. For example, counterfeit pharmaceutical tablets may include a feature unique to the tablets collectively that can be identified with a system described herein. Such information can be imaged, stored, and analyzed, as described herein, such as to assist in an anti-counterfeit campaign. In another example, a system described herein can be used to image, store, and analyze features of one or more labels associated with counterfeit label producer. In such an example, the unique feature(s) can be unique per label or unique across a set of labels in a manner that shows the set of labels are related.

Although various embodiments have been described as having particular features and/or combinations of components, other embodiments are possible having a combination of any features and/or components from any embodiment as discussed above. For example, authentication system 100 can include the computing device 230 of authentication system 200. In another example, authentication system 100 can include the unique signature production system.

What is claimed is:

1. An apparatus, comprising:
a label including a substrate and a plurality of flecks being randomly distributed on the substrate, at least a portion of the plurality of flecks forming a unique signature configured to be associated with a good and to be captured by an imaging device for verifying the authenticity of the good, the label including a serialization code configured to be electronically associated with the unique signature.

2. The apparatus of claim 1, wherein the label includes a top layer coupled to the substrate, the plurality of flecks being randomly disposed between the substrate and the top layer.

3. The apparatus of claim 2, wherein the plurality of flecks are disposed in an adhesive layer between the substrate and the top layer.

4. The apparatus of claim 1, wherein the serialization code includes at least one of a unique alphanumeric or bar code having instructions for a lighting configuration to be implemented by the imaging device for capturing an image of the unique signature.

5. The apparatus of claim 1, wherein the serialization code includes instructions identifying which portion of the label includes the unique signature.

6. The apparatus of claim 1, wherein the serialization code includes instructions for locating the unique signature with reference to a fiducial mark.

7. The apparatus of claim 1, wherein the serialization code includes a bar code.

8. The apparatus of claim 1, wherein a graphic is printed onto a top layer of the label.

9. The apparatus of claim 1, wherein the label includes a fiducial mark.

10. The apparatus of claim 1, wherein the flecks have different colors.

11. The apparatus of claim 1, wherein the flecks are substantially planar.

12. The apparatus of claim 1, wherein the flecks are not coplanar.

13. The apparatus of claim 1, wherein the serialization code is configured to be electronically associated with the unique signature but not derivable from the unique signature by algorithm.

14. A system, comprising:
a plurality of labels, each label of the plurality of labels including a unique signature formed by a random pattern of particles disposed thereon, each label of the plurality of labels including a serialization code; and
a database configured to store information associated with the unique signature of each label of the plurality of labels, the database configured to store information associated with the serialization code of each label of the plurality of labels such that the information associated with the unique signature for a first label of the plurality of labels is electronically linked to the information associated with the serialization code of the first label.

15. The system of claim 14, wherein the code of the first label includes instructions for a lighting configuration to be implemented by an imaging device for capturing an image of the unique signature of the first label.

16. The system of claim 14, wherein the code of the first label includes instructions identifying which portion of the label includes the unique signature.

17. The system of claim 14, wherein the code of the first label includes instructions for locating the unique signature with reference to a fiducial mark.

18. The system of claim 14, further comprising:
an authentication center in electrical communication with the database, the authentication center configured to interrogate the unique signature of the first label of the plurality of labels, the authentication center configured to make an authenticity determination based on the interrogation.

19. The system of claim 14 wherein the particles have different colors.

20. The system of claim 14, wherein the particles are substantially planar.

* * * * *